US012676114B2

(12) United States Patent
Kim et al.

(10) Patent No.: US 12,676,114 B2
(45) Date of Patent: Jul. 7, 2026

(54) DISPLAY DEVICE AND ELECTRONIC DEVICE INCLUDING THE DISPLAY DEVICE

(71) Applicant: SAMSUNG DISPLAY CO., LTD., Yongin-si (KR)

(72) Inventors: Hongsoo Kim, Yongin-si (KR); Sehyuk Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/065,038

(22) Filed: Feb. 27, 2025

(65) Prior Publication Data

US 2025/0378784 A1 Dec. 11, 2025

(30) Foreign Application Priority Data

Jun. 10, 2024 (KR) ........................ 10-2024-0074999

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/068* (2013.01); *G09G 2330/021* (2013.01)

(58) Field of Classification Search
CPC ........... H10K 59/00–95; H10K 50/858; H10K 59/12; H10K 59/879; H10K 59/353; H10K 59/38; G09G 2320/068; G09G 2320/028; G09G 3/3233; G09G 3/3208; G09G 2380/10; B60K 35/22; B60K 35/81; B60K 37/20; G02F 1/1347; G02F 1/1323; G02F 1/13471; G06F 3/0488; G06T 2207/10012; G06T 7/593
See application file for complete search history.

(56) References Cited

U.S. PATENT DOCUMENTS

| | | | | |
|---|---|---|---|---|
| 11,176,880 | B2 | 11/2021 | Gu et al. | |
| 2008/0055221 | A1* | 3/2008 | Yabuta | G09G 3/3611 345/90 |
| 2009/0185083 | A1* | 7/2009 | Ohtoshi | H04N 21/43072 348/740 |
| 2014/0327694 | A1* | 11/2014 | Cao | G06T 11/001 345/589 |
| 2023/0217763 | A1* | 7/2023 | Hong | G09G 3/3266 |
| 2024/0257719 | A1* | 8/2024 | Shin | G09G 3/32 |

FOREIGN PATENT DOCUMENTS

| | | | |
|---|---|---|---|
| KR | 10-0711890 | B1 | 4/2007 |
| KR | 10-2390099 | B1 | 4/2022 |
| KR | 10-2022-0151061 | A | 11/2022 |

* cited by examiner

*Primary Examiner* — Sanjiv D. Patel
(74) *Attorney, Agent, or Firm* — F. CHAU & ASSOCIATES, LLC

(57) ABSTRACT

A display device includes a display panel, a gate driver, a data driver, an emission driver, a driving controller, and a viewing angle controller for providing the display panel with a first viewing angle signal and a second viewing angle signal, in which display image data are alternately displayed on the display panel with different viewing angles by a first light emitting circuit and a second light emitting circuit in response to the first viewing angle signal and the second viewing angle signal, and a viewing angle of the second light emitting circuit is narrower than a viewing angle of the first light emitting circuit.

18 Claims, 17 Drawing Sheets

DISPLAY DEVICE AND ELECTRONIC DEVICE INCLUDING THE DISPLAY DEVICE

CROSS-REFERENCE TO RELATED APPLICATION

This application claims priority under 35 U.S.C. § 119 to Korean Patent Application No. 10-2024-0074999, filed on Jun. 10, 2024 in the Korean Intellectual Property Office KIPO, the entire disclosure of which is incorporated by reference herein in its entirety.

TECHNICAL FIELD

Embodiments of the present inventive concept relate to a display device and an electronic device in which the display device is applied, and a method of operating the display device. More particularly, embodiments of the present inventive concept relate to the display device reducing dead space and power consumption of the display device, and the method of operating the display device.

DISCUSSION OF THE RELATED ART

A display device may include a display panel, a gate driver, a data driver, an emission driver and a driving controller. The display panel includes a plurality of gate lines, a plurality of emission lines, a plurality of data lines and a plurality of pixels. The gate driver provides a gate signal to the plurality of gate lines. The data driver provides a data voltage to the plurality of data lines. The emission driver provides an emission signal to the plurality of emission lines. The driving controller controls the gate driver, the data driver and the emission driver.

For providing the narrow viewing angle mode, each of the pixels may include a first light emitting element, a second light emitting element. A viewing angle of the second light emitting element is narrower than a viewing angle of the first light emitting element. A first viewing angle control transistor may be connected to the first light emitting element and a second viewing angle control transistor may be connected to the second light emitting element respectively. In many instances, additional scan drivers are needed in a display device to generate and control various view angle signals. The additional scan drivers may require extra space and higher power consumption.

SUMMARY

Example embodiments provide a display device, an electronic device in which the display device is applied, and a method of operating the display device.

According to an embodiment, the display device includes a display panel including a plurality of pixels, a gate driver configured to generate a gate signal for providing the plurality of pixels with the gate signal, a data driver configured to generate a data voltage for providing the plurality of pixels with the data voltage, an emission driver configured to generate an emission signal for providing the plurality of pixels with the emission signal, a driving controller configured to generate a display image data based on input image data, and a viewing angle controller configured to generate a first viewing angle signal and a second viewing angle signal for providing the plurality of pixels with the first viewing angle signal and the second viewing angle signal, wherein the display image data are alternately displayed on the display panel with different viewing angles in response to the first viewing angle signal and the second viewing angle signal, wherein each of the plurality of pixels includes a first light emitting circuit including a first light emitting element and a first viewing angle control transistor, in which the first viewing angle control transistor is turned on in response to the first viewing angle signal for transmitting a driving current to the first light emitting element, and a second light emitting circuit including a second light emitting element and a second viewing angle control transistor, in which the second viewing angle control transistor is turned on in response to the second viewing angle signal for transmitting the driving current to the second light emitting element, and wherein a viewing angle of the second light emitting circuit is narrower than a viewing angle of the first light emitting circuit.

Each of the plurality of pixels is configured to receive the first viewing angle signal and the second viewing angle signal through a first viewing angle signal line and a second viewing angle signal line respectively.

Each of the plurality of pixels includes a compensation circuit, and the compensation circuit includes a data writing transistor configured to receive the data voltage, a driving transistor configured to generate a driving current corresponding to the data voltage, and an emission transistor configured to transmit the driving current to the first light emitting circuit and the second light emitting circuit in response to the emission signal, wherein the compensation circuit is configured to compensate a threshold voltage of the driving transistor.

The gate electrode of the first viewing angle control transistor is connected to the first viewing angle signal line, a source electrode of the first viewing angle control transistor is connected to the compensation circuit, and a drain electrode of the first viewing angle control transistor is connected to an anode electrode of the first light emitting element, and the gate electrode of the second viewing angle control transistor is connected to the second viewing angle signal line, a source electrode of the second viewing angle control transistor is connected to the compensation circuit, and a drain electrode of the second viewing angle control transistor is connected to an anode electrode of the second light emitting element.

The gate electrode of the emission transistor receives the emission signal, a source electrode of the emission transistor is connected to a drain electrode of the driving transistor and a drain electrode of the emission transistor is connected to the source electrode of the first viewing angle control transistor, and the source electrode of the second viewing angle control transistor is connected to the drain electrode of the emission transistor.

The first viewing angle signal has an activation level and the second viewing angle signal has a deactivation level in an odd frame, in which the odd frame is odd-numbered frame among a series of frames, and the first viewing angle signal has a deactivation level and the second viewing angle signal has an activation level in an even frame, in which the even frame is even-numbered frame among the series of frames.

In the odd frame, the first viewing angle signal has a logic low level and the second viewing angle signal has a logic high level, and, in the even frame, the first viewing angle signal has a logic high level and the second viewing angle signal has a logic low level.

In the odd frame, the first viewing angle signal has an activation level and the second viewing angle signal has an activation level, in which the odd frame is odd-numbered frame among a series of frames, and, in an even frame, the first viewing angle signal has a deactivation level and the second viewing angle signal has an activation level, in which the even frame is even-numbered frame among the series of frames.

In the odd frame, the first viewing angle signal has a logic low level and the second viewing angle signal has a logic low level, and, in the even frame, the first viewing angle signal has a logic high level and the second viewing angle signal has a logic low level.

The viewing angle controller is embedded in one of the gate driver, the data driver, the emission driver and the driving controller.

According to an embodiment, the display panel including a plurality of pixels, a gate driver configured to generate a gate signal for providing the plurality of pixels with the gate signal, a data driver configured to generate a data voltage for providing the plurality of pixels with the data voltage, an emission driver configured to generate an emission signal for providing the plurality of pixels with the emission signal, a driving controller configured to generate display image data based on input image data, and a viewing angle controller configured to generate a first viewing angle signal and a second viewing angle signal for providing the plurality of pixels with the first viewing angle signal and the second viewing angle signal, wherein the display image data are alternately displayed on the display panel with different viewing angles in response to the first viewing angle signal and the second viewing angle signal, wherein each of the plurality of pixels includes, a first light emitting circuit including a first light emitting element and a first viewing angle control transistor, in which the first viewing angle control transistor is turned on in response to the first viewing angle signal for transmitting a driving current to the first light emitting element, and a second light emitting circuit including a second light emitting element and a second viewing angle control transistor, in which the second viewing angle control transistor is turned on in response to the second viewing angle signal for transmitting the driving current to the second light emitting element, wherein a viewing angle of the second light emitting circuit is narrower than a viewing angle of the first light emitting circuit, and wherein the display device is configured to operate in one of a normal mode and a narrow viewing angle mode, in which a viewing angle in the narrow viewing angle mode is narrower than a viewing angle in the normal mode.

In the normal mode, the first viewing angle signal has an activation level and the second viewing angle signal has a deactivation level in the odd and even frames, in which the odd frame is odd-numbered frame among a series of frames and the even frame is even-numbered frame among the series of frames, and, in the narrow viewing angle mode, the first viewing angle signal has the activation level and the second viewing angle signal has the deactivation level in the odd frame, and the first viewing angle signal has a deactivation level and the second viewing angle signal has an activation level in the even frame.

In the normal mode, the first viewing angle signal has a logic low level and the second viewing angle signal has a logic high level in the odd and even frames, and, in the narrow viewing angle mode, the first viewing angle signal has a logic low level and the second viewing angle signal has a logic high level in the odd frame, and the first viewing angle signal has a logic high level and the second viewing angle signal has a logic low level in the even frame.

In the normal mode, the first viewing angle signal has an activation level and the second viewing angle signal has a deactivation level in the odd and even frames, in which the odd frame is odd-numbered frame among a series of frames and the even frame is even-numbered frame among the series of frames, and, in the narrow viewing angle mode, both the first viewing angle signal and the second viewing angle signal have the activation level in the odd frame, and the first viewing angle signal has a deactivation level and the second viewing angle signal has the activation level in the even frame.

In the normal mode, the first viewing angle signal has a logic low level in the even and odd frames and the second viewing angle signal has a logic high level in the even and odd frames, and, in the narrow viewing angle mode, the first viewing angle signal has a logic low level and the second viewing angle signal has a logic low level in the odd frame, and the first viewing angle signal has a logic high level and the second viewing angle signal has a logic low level in the even frame.

Each of the plurality of pixels is configured to receive the first viewing angle signal and the second viewing angle signal through a first viewing angle signal line and a second viewing angle signal line respectively.

Each of the plurality of pixels includes a compensation circuit, and the compensation circuit includes, a data writing transistor configured to receive the data voltage, a driving transistor configured to generate a driving current corresponding to the data voltage, and an emission transistor configured to transmit the driving current to the first light emitting circuit and the second light emitting circuit in response to the emission signal, and wherein the compensation circuit is configured to compensate a threshold voltage of the driving transistor.

The gate electrode of the first viewing angle control transistor is connected to the first viewing angle signal line, a source electrode of the first viewing angle control transistor is connected to the compensation circuit and a drain electrode of the first viewing angle control transistor is connected to an anode electrode of the first light emitting element, wherein the gate electrode of the second viewing angle control transistor is connected to the second viewing angle signal line, a source electrode of the second viewing angle control transistor is connected to the compensation circuit and a drain electrode of the second viewing angle control transistor is connected to an anode electrode of the second light emitting element.

According to an embodiment, the electronic device comprises a processor configured to output an input control signal and input image data, a display device configured to display images based on the input image data, the display device comprising, a display panel including a plurality of pixels, a gate driver configured to generate a gate signal for providing the plurality of pixels with the gate signal, a data driver configured to generate a data voltage for providing the plurality of pixels with the data voltage, an emission driver configured to generate an emission signal for providing the plurality of pixels with the emission signal, a driving controller configured to generate display image data based on the input control signal and the input image data, and a viewing angle controller configured to generate a first viewing angle signal and a second viewing angle signal for providing the plurality of pixels with the first viewing angle signal and the second viewing angle signal, wherein the display image data are alternately displayed on the display panel with different viewing angles in response to the first viewing angle signal and the second viewing angle signal, wherein each of the plurality of pixels includes a first light emitting circuit including a first light emitting element and a first viewing angle control transistor, in which the first viewing angle control transistor is turned on in response to the first viewing angle signal for transmitting a driving current to the first light emitting element, and a second light emitting circuit including a second light emitting element and a second viewing angle control transistor, in which the second viewing angle control transistor is turned on in response to the second viewing angle signal for transmitting the driving current to the second light emitting element, and wherein a viewing angle of the second light emitting circuit is narrower than a viewing angle of the first light emitting circuit.

The electronic device further includes an input/output (IO) device configured to sense user input via touch or cursor select of an icon presented on the display panel, wherein the processor is caused to execute one of the first viewing angle mode or the second viewing angle mode of the display device upon receipt of the user input, The display panel includes a normal viewing angle area and a narrow viewing angle area, and when the processor is caused to execute first viewing angle mode, the viewing angle of the normal viewing angle area and the viewing angle of the narrow viewing angle area are substantially same, and when the processor is caused to execute second viewing angle mode, the viewing angle of the narrow viewing angle area is narrower than the viewing angle of the normal viewing angle area.

BRIEF DESCRIPTION OF THE DRAWINGS

The above and other aspects, features and advantages of the present inventive concept will be more clearly understood from the following detailed description, taken in conjunction with the accompanying drawings, in which.

DETAILED DESCRIPTION OF THE EMBODIMENTS

Figure 1:
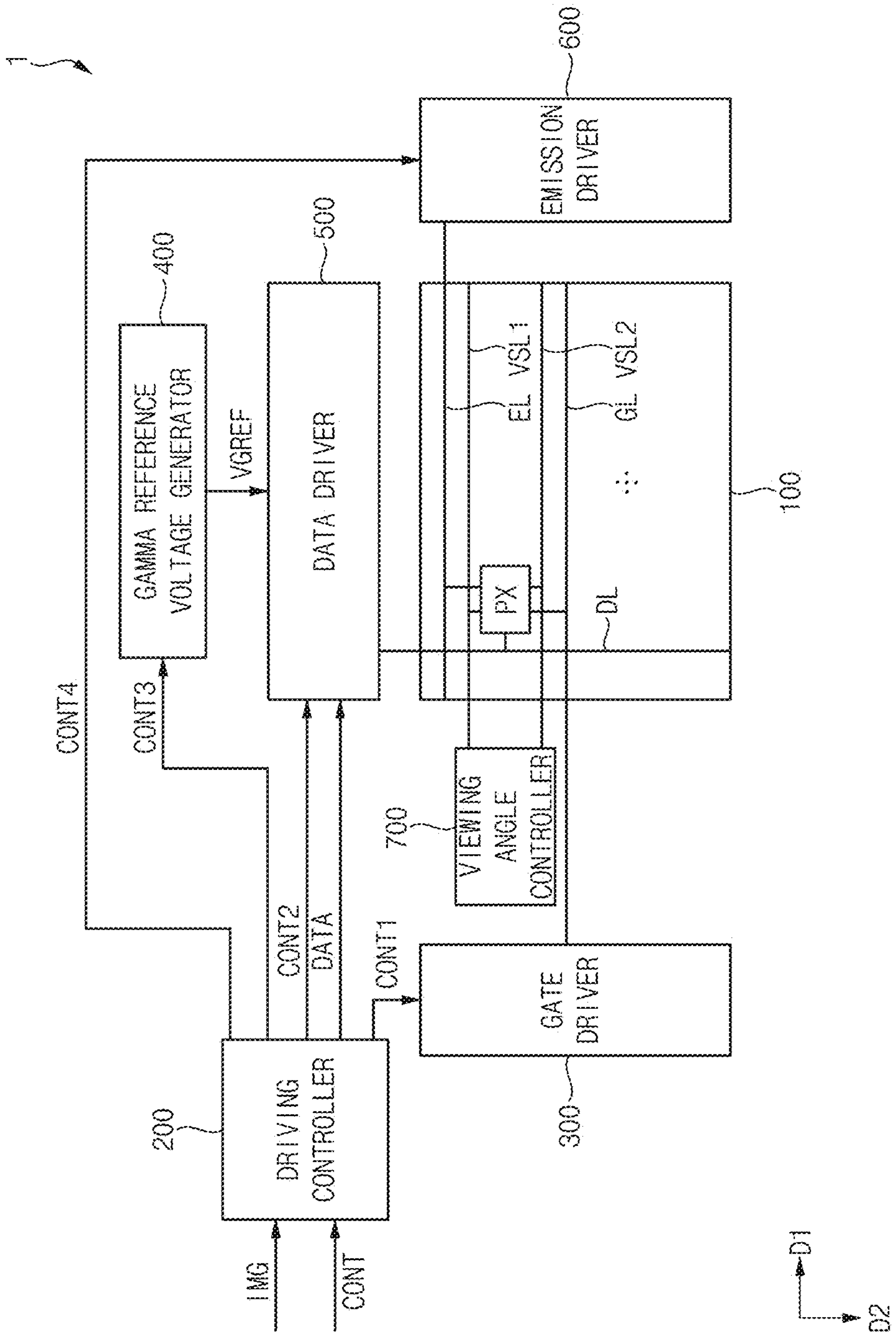
FIG. 1 is a block diagram illustrating a display device according to an embodiment of the present inventive concept.

Hereinafter, display devices in accordance with embodiments will be described in more detail with reference to the accompanying drawings. The same reference numerals are used for the same components in the drawings.

The display devices display image data having different viewing angles on a display panel. The display devices may provide two viewing angle modes, one of which is a normal viewing angle mode and the other is a narrow viewing angle mode. Herein, the normal viewing angle mode is also referred to as a normal mode. A viewing angle controller of the display devices generate a normal viewing angle signal and a narrow viewing angle signal. A first light emitting circuit and a second light emitting circuit of the display devices alternately display the image data in different time frames on the display panel in response to the normal viewing angle signal and the narrow viewing angle signal. The viewing angle of the second light emitting circuit is narrower than a viewing angle of the first light emitting circuit. Because the first light emitting circuit and the second light emitting circuit share common circuits, dead space and power consumption of the display device may be reduced.

FIG. 1 is a block diagram illustrating a display device 1 according to an embodiment of the present inventive concept.

Referring to FIG. 1, the display device 1 includes a display panel 100, a driving controller 200, a gate driver 300, a gamma reference voltage generator 400, a data driver 500, an emission driver 600, and a viewing angle controller 700.

The display panel 100 has a display region on which an image is displayed and a peripheral region adjacent to the display region.

The display panel 100 includes a plurality of gate lines GL, a plurality of data lines DL, a plurality of emission lines EL, a first viewing angle signal line VSL1, a second viewing angle signal line VSL2, and a plurality of pixels PX. The plurality of pixels PX are electrically connected to the gate lines GL, the data lines DL, the emission lines EL, the first viewing angle signal line VSL1, and the second viewing angle signal line VSL2. The gate lines GL may extend in a first direction D1, the data lines DL may extend in a second direction D2 which is perpendicular to the first direction D1 and the emission lines EL may extend in the first direction D1. The first viewing angle signal line VSL1 and the second viewing angle signal line VSL2 may extend in the first direction D1.

The driving controller 200 receives input image data IMG and an input control signal CONT from an external device. For example, the input image data IMG may include red image data, green image data and blue image data. The input image data IMG may further include white image data, magenta image data, cyan image data and yellow image data depending on applications of the display device 1. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT. The data signal DATA may include a display image.

The driving controller 200 generates the first control signal CONT1 for controlling an operation of the gate driver 300 based on the input control signal CONT, and provides the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and provides the second control signal CONT2 to the data driver 500. The second control signal CONT2 may include a horizontal start signal and a load signal.

The driving controller 200 generates the data signal DATA based on the input image data IMG, and provides the data signal DATA to the data driver 500.

The driving controller 200 generates the third control signal CONT3 for controlling an operation of the gamma reference voltage generator 400 based on the input control signal CONT, and provides the third control signal CONT3 to the gamma reference voltage generator 400.

The driving controller 200 generates the fourth control signal CONT4 for controlling an operation of the emission driver 600 based on the input control signal CONT, and provides the fourth control signal CONT4 to the emission driver 600.

The gate driver 300 may generate gate signals driving the gate lines GL in response to the first control signal CONT1 received from the driving controller 200. The gate driver 300 may provide the gate signals to the gate lines GL. The gate signals may include an initialization signal, a compensation signal, a data writing signal, and a bias signal.

According to an embodiment, the gate driver 300 may be integrated on the peripheral region of the display panel 100. Alternatively, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may provide a reference value for determining a value of the data signal DATA.

The gamma reference voltage generator 400 may be embedded in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 provides the data voltages to the data lines DL.

The data driver 500 may be integrated on the peripheral region of the display panel 100. Alternatively, the data driver 500 may be mounted on the peripheral region of the display panel 100.

Although the driving controller 200, the data driver 500 and the gamma reference voltage generator 400 are illustrated as separate circuit blocks in FIG. 1, some of the circuit blocks may be integrated in a circuit block. For example, the driving controller 200 and the data driver 500 may be integrated in a circuit block. The driving controller 200, the gamma reference voltage generator 400, and the data driver 500 may be integrated in a circuit block. A driving module in which the driving controller 200 and the data driver 500 are integrated in a circuit block may be referred to as a timing controller embedded data driver (TED).

The emission driver 600 may generate emission signals to drive the emission lines EL in response to the fourth control signal CONT4 received from the driving controller 200. The emission driver 600 may output the emission signals to the emission lines EL.

According to an embodiment, the emission driver 600 may be integrated on the peripheral region of the display panel 100. Alternatively, the emission driver 600 may be mounted on the peripheral region of the display panel 100.

The viewing angle controller 700 may provide a first viewing angle signal and a second viewing angle signal with which the viewing angle controller 700 may control a viewing angle of the display panel 100.

According to an embodiment, the viewing angle controller 700 may provide the pixels PX with the first viewing angle signal VS1 and the second viewing angle signal VS2 through the first viewing angle signal line VSL1 and the second viewing angle signal line VSL2. The first viewing angle signal line VSL1 and the second viewing angle signal line VSL2 may extend in the first direction D1. The first viewing angle signal line VSL1 may provide the pixels PX with the first viewing angle signal along the first direction D1, and the second viewing angle signal line VSL2 may provide the pixels PX with the second viewing angle signal along the first direction D1. The viewing angle controller 700 may provide the pixels PX with the first viewing angle signal through the first viewing angle signal line VSL1 for controlling the viewing angle of the display panel 100, and the viewing angle controller 700 may provide the pixels PX with the second viewing angle signal through the second viewing angle signal line VSL2 for controlling the viewing angle of the display panel 100.

The viewing angle controller 700 may receive a viewing angle control signal. The viewing angle controller 700 may output the first viewing angle signal and the second viewing angle signal in response to the viewing angle control signal.

Although the gate driver 300 is disposed at a first side of the display panel 100 and the emission driver 600 is disposed at a second side of the display panel 100 opposite to the first side in FIG. 1, the present inventive concept may not be limited thereto. Both of the gate driver 300 and the emission driver 600 may be disposed at the first side of the display panel 100. Alternatively, both of the gate driver 300 and the emission driver 600 may be disposed at both sides of the display panel 100. In addition, the gate driver 300 and the emission driver 600 may be integrated in a circuit block.

Figure 2:
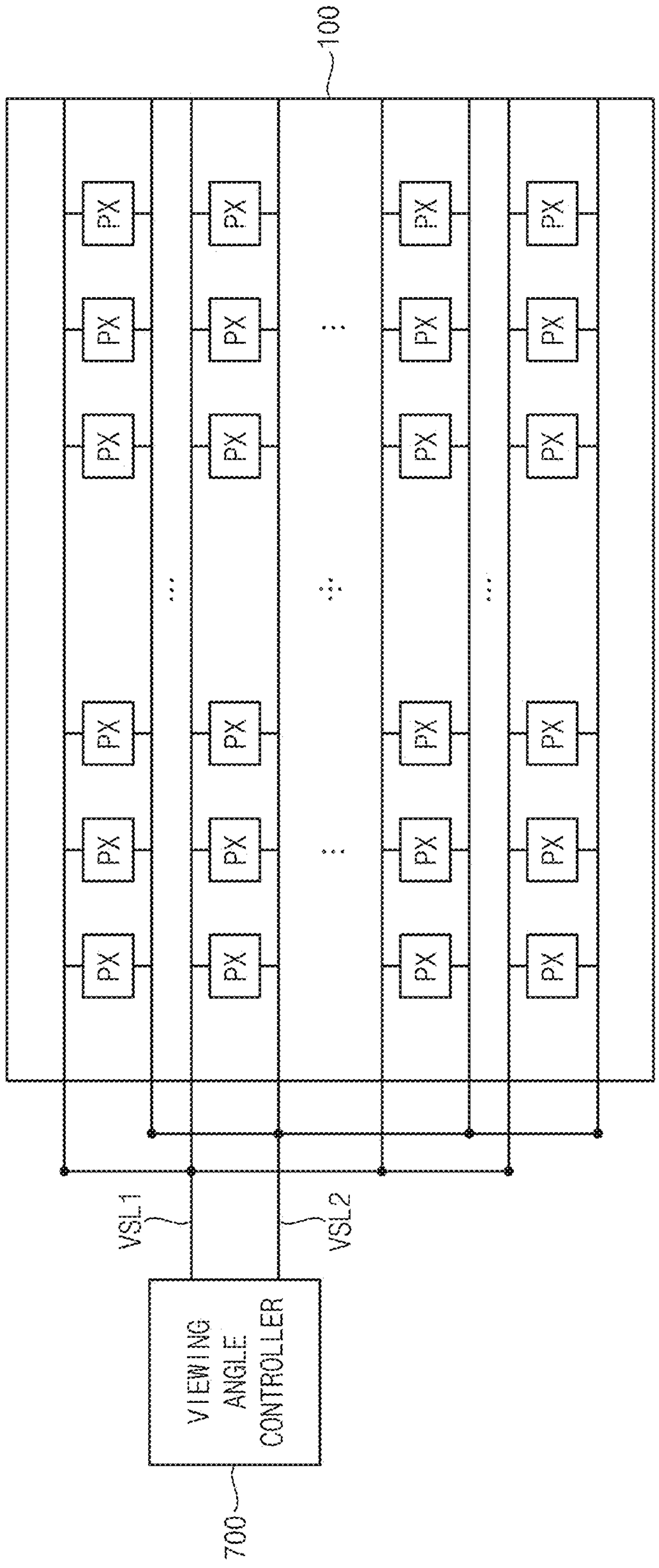
FIG. 2 is a block diagram illustrating a connection relationship between a plurality of pixels included in a display panel of FIG. 1 and a viewing angle controller.

FIG. 2 is a block diagram illustrating a connection relationship between the plurality of pixels PX and the viewing angle controller 700 of FIG. 1.

Referring to FIGS. 1 and 2, the display panel 100 may include the plurality of pixels PX. The plurality of pixels PX may be connected to the first viewing angle signal line VSL1 and the second viewing angle signal line VSL2.

The first viewing angle signal line VSL1 and the second viewing angle signal line VSL2 may extend in the first direction D1. The first viewing angle signal line VSL1 may be connected to the pixels PX along the first direction D1, and the second viewing angle signal line VSL2 may be connected to the pixels PX along the first direction D1.

The viewing angle controller 700 may provide the first viewing angle signal to the pixels PX through the first viewing angle signal line VSL1, and the viewing angle controller 700 may provide the second viewing angle signal to the pixels PX through the second viewing angle signal line VSL2.

The first and second viewing angle signals may be signals commonly applied to the plurality of pixels PX, and the first and second viewing angle signals may be simultaneously provided to the plurality of pixels PX. The first viewing angle signal and the second viewing angle signal may control the viewing angle of the display panel 100.

The viewing angle controller 700 provides the first viewing angle signal and the second viewing angle signal to the pixels PX through the first viewing angle signal line VSL1 and the second viewing angle signal line VSL2 respectively. Because additional scan driver for generating and outputting the first viewing angle signal and the second viewing angle signal is not necessary, dead space and power consumption of the display device 1 may be reduced, while a resolution of the display device 1 may be maintained.

Figure 3:
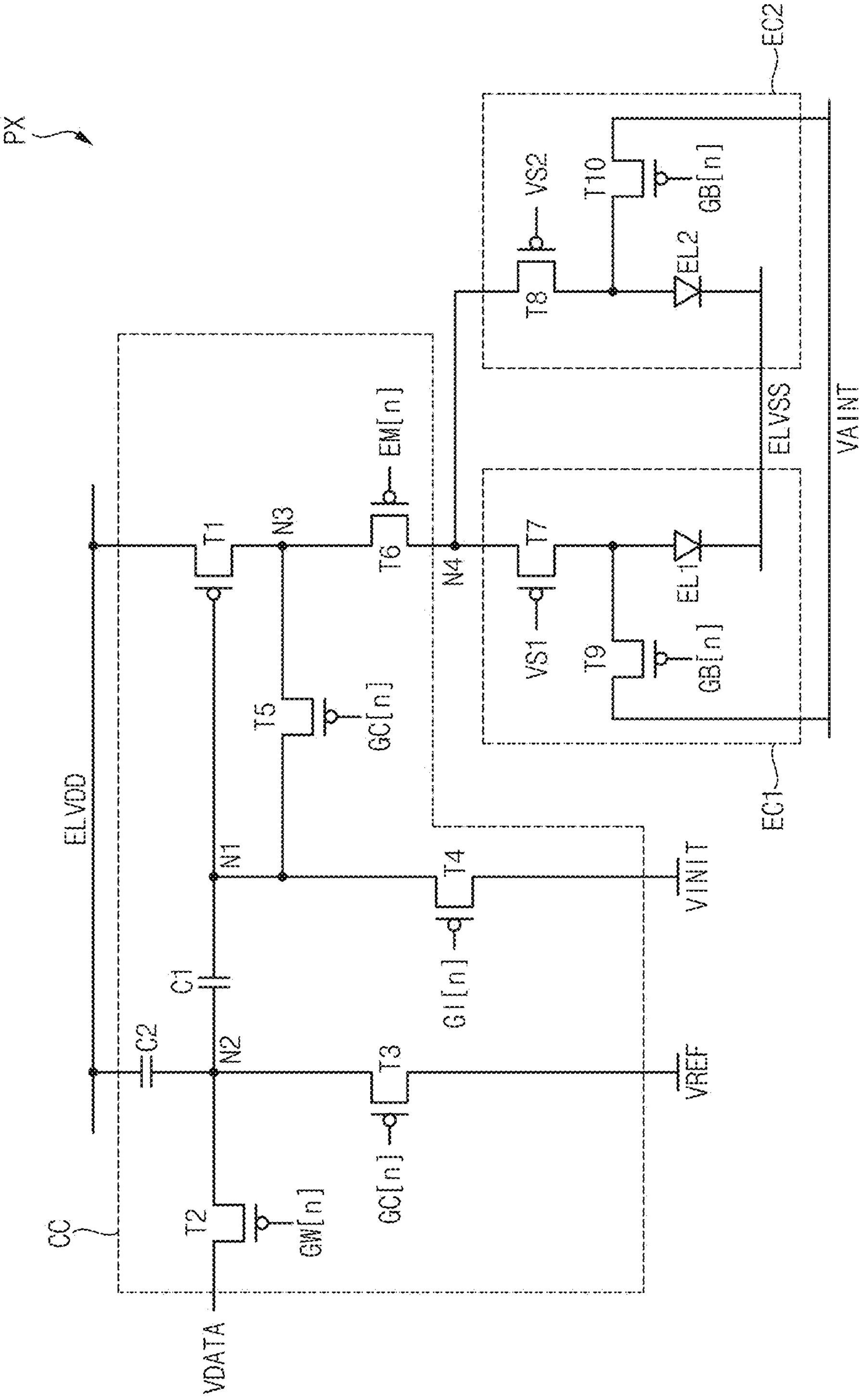
FIG. 3 is a circuit diagram illustrating a pixel according to an embodiment of the present inventive concept.

FIG. 3 is a circuit diagram illustrating the pixel PX according to an embodiment of the present inventive concept.

Referring to FIG. 3, the pixel PX may include a first light emitting circuit EC1, a second light emitting circuit EC2, and a compensation circuit CC. The first light emitting circuit EC1 and the second light emitting circuit EC2 may be connected to the compensation circuit CC.

The compensation circuit CC may include a first capacitor C1, a second capacitor C2, and a first transistor T1 to a sixth transistor T6.

A first electrode of the first capacitor C1 may be connected to a second node N2, and a second electrode of the first capacitor C1 may be connected to a first node N1.

A first electrode of the second capacitor C2 may receive a first power supply voltage ELVDD, and a second electrode of the first capacitor C2 may be connected to the second node N2.

A gate electrode of the first transistor T1 may be connected to the first node N1, a source electrode of the first transistor T1 may receive the first power supply voltage ELVDD, and a drain electrode of the first transistor T1 may be connected to a third node N3. The gate electrode of the first transistor T1 may be coupled to a data line DL and generate a driving current corresponding to the data voltage VDATA. The first transistor T1 may be referred to as a driving transistor.

A gate electrode of the second transistor T2 may receive a data writing signal GW[n], a source electrode of the second transistor T2 may receive the data voltage VDATA, and a drain electrode of the second transistor T2 may be connected to the second node N2. The second transistor T2 may be referred to as a data writing transistor.

A gate electrode of the third transistor T3 may receive a compensation signal GC[n], a source electrode of the third transistor T3 may be connected to the second node N2, and a drain electrode of the third transistor T3 may be coupled to a reference voltage VREF.

A gate electrode of the fourth transistor T4 may receive an initialization signal GI[n], a source electrode of the fourth transistor T4 may be connected to the first node N1, and a drain electrode of the fourth transistor T4 may be coupled to an initialization voltage VINIT.

A gate electrode of the fifth transistor T5 may receive the compensation signal GC[n], a source electrode of the fifth transistor T5 may be connected to the first node N1, and a drain electrode of the fifth transistor T5 may be connected to the third node N3.

A gate electrode of the sixth transistor T6 may receive an emission signal EM[n], a source electrode of the sixth transistor T6 may connected to the third node N3, and a drain electrode of the sixth transistor T6 may be connected to a fourth node N4. The sixth transistor T6 may transmit the driving current to the first light emitting circuit EC1 and/or the second light emitting circuit EC2 in response to the emission signal EM[n]. The sixth transistor T6 may be referred to as an emission transistor.

Because the first transistor T1 may suffer from deterioration in an application field, the threshold voltage of the first transistor T1 may be shifted. The compensation circuit CC may compensate a shift of the threshold voltage of the first transistor T1.

The first light emitting circuit EC1 may include a first light emitting element EL1, a seventh transistor T7, and a ninth transistor T9.

An anode electrode of the first light emitting element EL1 may be connected to the seventh transistor T7 and the ninth transistor T9, and a cathode electrode of the first light emitting element EL1 may be coupled to a second power supply voltage ELVSS.

A gate electrode of the seventh transistor T7 may receive the first viewing angle signal VS1, a source electrode of the seventh transistor T7 may be connected to the fourth node N4, and a drain electrode of the seventh transistor T7 may be connected to the anode electrode of the first light emitting element EL1. The seventh transistor T7 may be referred to as a first viewing angle control transistor.

A gate electrode of the T9 may receive a bias signal GB[n], a source electrode of the ninth transistor T9 may be connected to the anode electrode of the first light emitting element EL1, and a drain electrode of the ninth transistor T9 may be coupled to an anode initialization voltage VAINT.

When the first viewing angle signal VS1 is an activation level, for example, a logic low level, the seventh transistor T7 may be turned on to transmit the driving current generated by the first transistor T1 to the first light emitting element EL1. When the driving current is transmitted to the first light emitting element EL1, the first light emitting element EL1 may be turned on to emit a light at a level of luminance corresponding to the driving current.

The light emitting circuit EC2 may include a second light emitting element EL2, an eighth transistor T8, and a tenth transistor T10. A viewing angle of the second light emitting circuit EC2 may be narrower than a viewing angle of the first light emitting circuit EC1. More particularly, a viewing angle of a display image displayed through the second light emitting circuit EC2 may be narrower than a viewing angle of a display image displayed through the first light emitting circuit EC1. For example, a first display image displayed in a first light emitting area by the first light emitting circuit EC1 may not be affected from the viewing angle while a second display image displayed in a second light emitting area by the second light emitting circuit EC2 may be viewed within limited viewing angle of the second display image.

An anode electrode of the second light emitting element EL2 may be connected to the eighth transistor T8 and the tenth transistor T10, and a cathode electrode of the second light emitting element EL2 may be coupled to the second power supply voltage ELVSS.

The second light emitting element EL2 may be smaller than the first light emitting element EL1, but the present inventive concept may not be limited thereto.

A gate electrode of the eighth transistor T8 may receive the second viewing angle signal VS2, a source electrode of the eighth transistor T8 may be connected to the fourth node N4, and a drain electrode of the eighth transistor T8 may be connected to the anode electrode of the second light emitting element EL2. The eighth transistor T8 may be referred to as a second viewing angle control transistor.

A gate electrode of the tenth transistor T10 may receive the bias signal GB[n], a source electrode of the tenth transistor T10 may be connected to the anode electrode of the second light emitting element EL2 and a drain electrode of the tenth transistor T10 may be coupled to the anode initialization voltage VAINT.

When the second viewing angle signal VS2 is an activation level, for example, a logic low level, the eighth transistor T8 may be turned on to transmit the driving current generated by the first transistor T1 to the second light emitting element EL2. When the driving current is transmitted to the second light emitting element EL2, the second light emitting element EL2 may be turned on to emit a light at a level of luminance corresponding to the driving current.

Although the first transistor T1 to the tenth transistor T10 are implemented with PMOS (P-channel Metal Oxide Semiconductor) transistors in FIG. 3, other types of transistors may be used for the implementation. For example, each of the first transistor T1 to the tenth transistor T10 may be implemented with NMOS (N-channel Metal Oxide Semiconductor) transistors.

Although each of the second transistor T2 to the fifth transistor T5 is implemented with single transistor in FIG. 3, the present inventive concept may not be limited thereto. For example, each of the second transistor T2 to the fifth transistor T5 may be implemented with two or more transistors connected in series to reduce leakage current while the transistors are turned off.

Because the first light emitting circuit EC1 and the second light emitting circuit EC2 share the compensation circuit CC, the pixels PX may efficiently laid out, and the resolution of the display device 1 may be increased. Because of the efficient layout of the pixels, dead space and power consumption of the display device 1 may be reduced. The term "dead space" in a display panel, also known as bezel, refers to the outer edges of the display where no image is shown. This area doesn't emit light and typically contains the electronics and circuitry necessary for the display to function.

Figure 4:
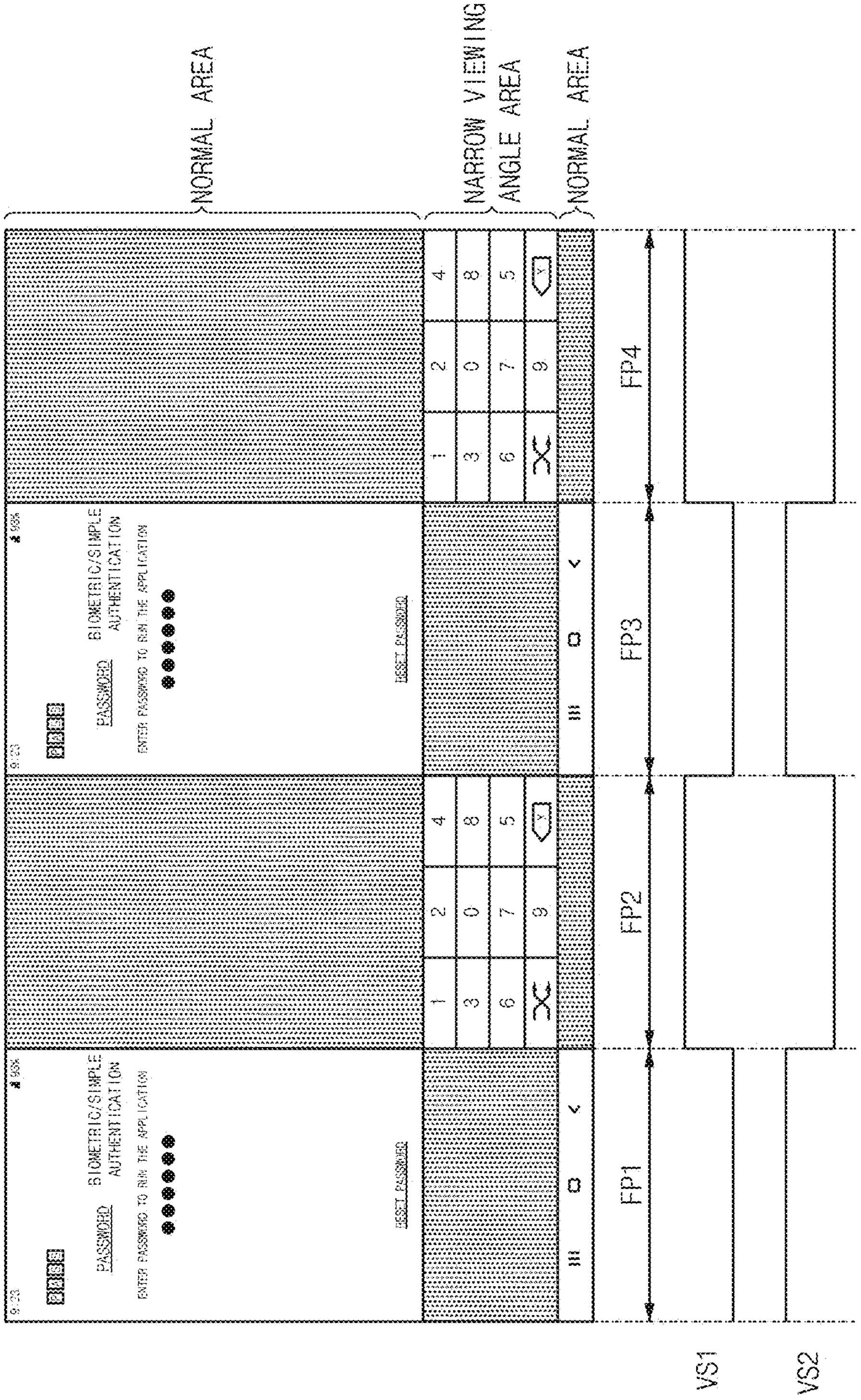
FIG. 4 is a timing diagram illustrating an operation of the pixel of FIG. 3 according to an embodiment of the present inventive concept.
Figure 5:
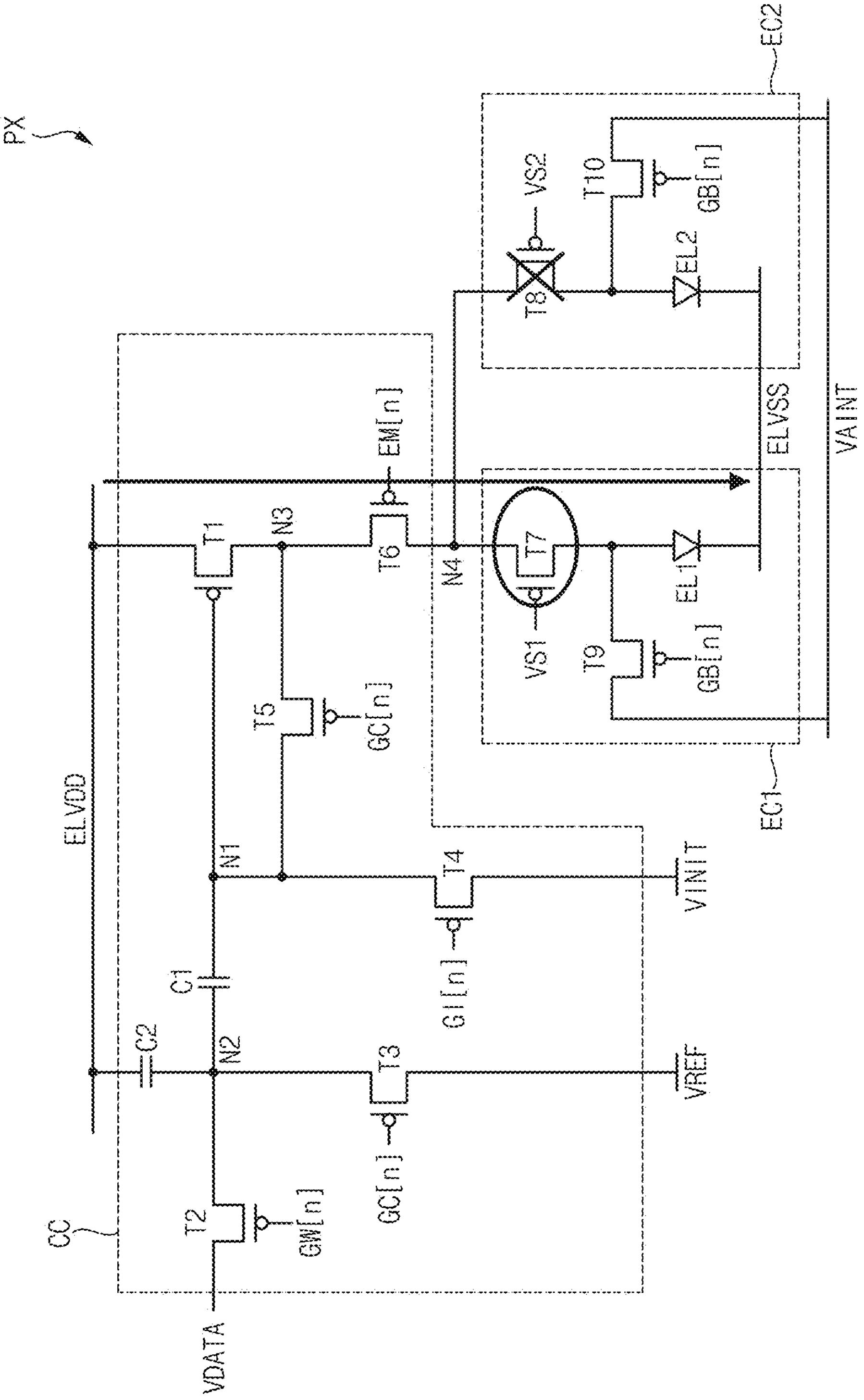
FIG. 5 is a circuit diagram illustrating an operation of the pixel of FIG. 3 in a first frame and a third frame of the timing diagram of FIG. 4.
Figure 6:
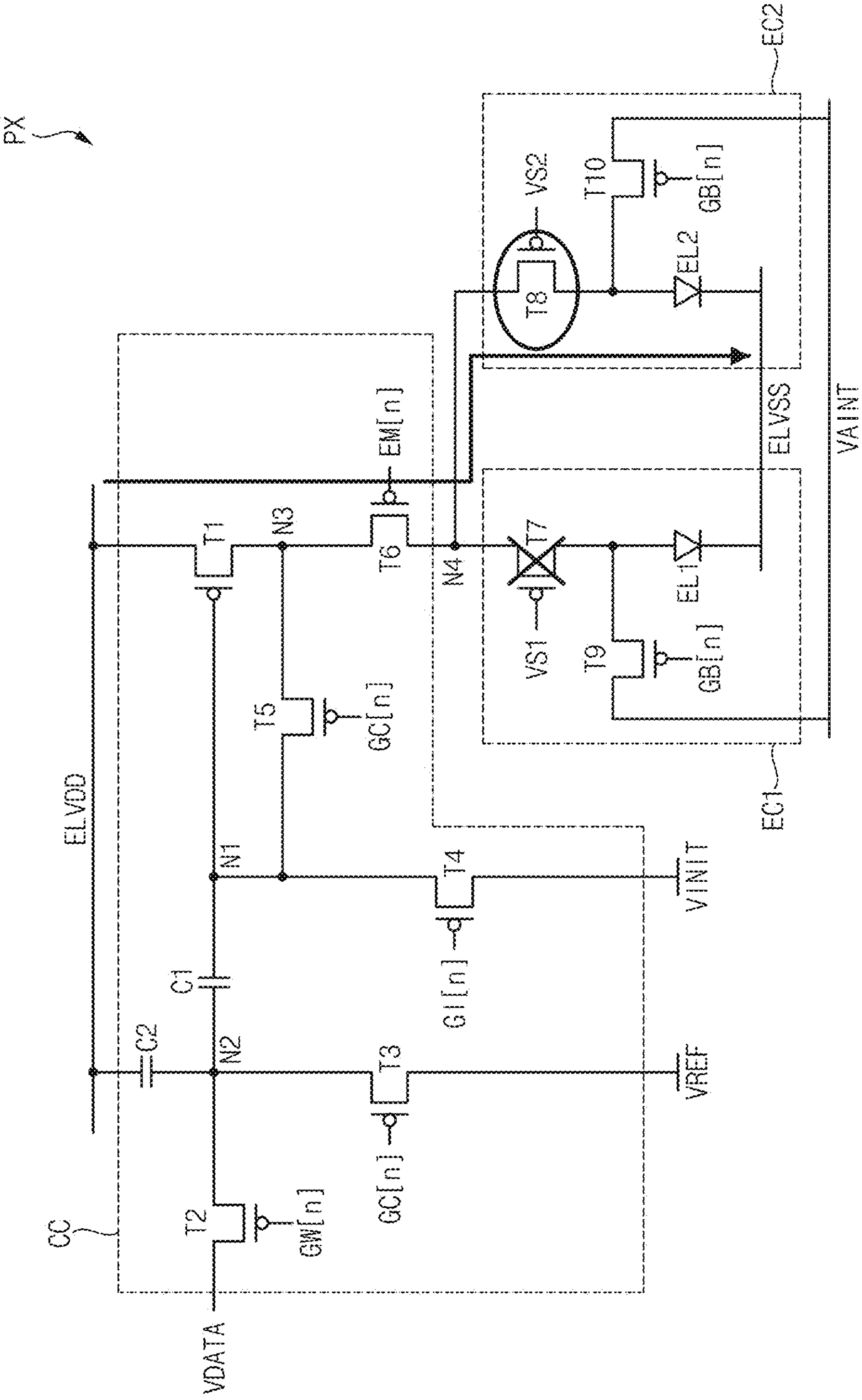
FIG. 6 is a circuit diagram illustrating an operation of the pixel of FIG. 3 in a second frame and a fourth frame of the timing diagram of FIG. 4.

FIG. 4 is a timing diagram illustrating an operation of the pixel PX of FIG. 3 according to an embodiment of the present inventive concept. FIG. 5 is a circuit diagram illustrating an operation of the pixel PX of FIG. 3 in a first frame FP1 and a third frame FP3 of the timing diagram of FIG. 4. FIG. 6 is a circuit diagram illustrating an operation of the pixel PX of FIG. 3 in a second frame FP2 and a fourth frame FP4 of the timing diagram of FIG. 4.

Referring to FIGS. 1, 3 and 4, the display panel 100 may include a normal area and a narrow viewing angle area. The display panel 100 may display the odd frame and the even frame alternately in the normal area of the display panel 100 and the narrow viewing angle area of the display panel 100.

According to an embodiment, in the odd frame, the first viewing angle signal VS1 may have an activation level and the second viewing angle signal VS2 may have a deactivation level, where the odd frame is odd-numbered frame among a series of frames. The activation level may be a logic low level and the deactivation level may be a logic high level respectively. The odd frame may be the first frame FP1 or the third frame FP3. The data driver 500 may provide a normal image data voltage as the data voltage for the normal area of the display panel 100, and may not provide the data voltage for the narrow viewing angle area of the display panel 100. Alternatively, the data driver 500 may output the normal image data voltage as the data voltage for the normal area of the display panel 100, and output a black image data voltage as the data voltage for the narrow viewing angle area of the display panel 100.

In an even frame, the first viewing angle signal VS1 may have a deactivation level and the second viewing angle signal VS2 may have an activation level. The even frame is even numbered frame among a series of frames. The activation level may be a logic low level and the deactivation level may be a logic high level. The even frame may be a second frame FP2 or a fourth frame FP4. The data driver 500 may not provide the data voltage for the normal area of the display panel 100, and provide a narrow viewing angle image data voltage as the data voltage for the narrow viewing angle area of the display panel 100. Alternatively, the data driver 500 may provide the black image data voltage as the data voltage for the normal area of the display panel 100, and provide the narrow viewing angle image data voltage as the data voltage for the narrow viewing angle area of the display panel 100.

Referring to FIGS. 3 to 5, the first viewing angle signal VS1 may have the activation level and the seventh transistor T7 may be turned on in the odd frame. The activation level may be a logic low level and the odd frame may be a first frame FP1 or the third frame FP3. The second viewing angle signal VS2 may have the deactivation level and the eighth transistor T8 may be turned off in the odd frame. The deactivation level may be a logic high level and odd frame may be a first frame FP1 or the third frame FP3. The driving current generated by the first transistor T1 may be transmitted to the first light emitting circuit EC1 and may not be transmitted to the second light emitting circuit EC2. The first light emitting element EL1 of the first light emitting circuit EC1 may be turned on to emit a light by the driving current while the second light emitting element EL2 of the second light emitting circuit EC2 may remain turned off. A normal image may be displayed in the normal area of the display panel 100, and the image may not be displayed in the narrow viewing angle area of the display panel 100. Alternatively, the normal image may be displayed in the normal area of the display panel 100, and a black image may be displayed in the narrow viewing angle area of the display panel 100.

Referring to FIGS. 3, 4 and 6, the first viewing angle signal VS1 may have the deactivation level and the seventh transistor T7 may be turned off in the even frame. The second viewing angle signal VS2 may have the activation level, and the eighth transistor T8 may be turned on in the even frame. The activation level may be a logic low level and the deactivation level may be a logic high level. The even frame may be a second frame FP2 or a fourth frame FP4. The driving current generated by the first transistor T1 may be transmitted to the second light emitting circuit EC2, and may not be transmitted to the first light emitting circuit EC1. The second light emitting element EL2 of the second light emitting circuit EC2 may be turned on to emit a light by the driving current while the first light emitting element EL1 the first light emitting circuit EC1 may remain turned off. The viewing angle of the display image displayed with the second light emitting element EL2 may be narrower than the viewing angle of the first light emitting element EL1. The normal image may not be displayed in the normal area of the display panel 100, and a narrow viewing angle image may be displayed in the narrow viewing angle area of the display panel 100. Alternatively, the black image may be displayed in the normal area of the display panel 100, and the narrow viewing angle image may be displayed in the narrow viewing angle area of the display panel 100.

Because the first light emitting circuit EC1 and the second light emitting circuit EC2 are alternately activated, the overall exposure time for the narrow viewing angle area may be reduced. More particularly, because the first light emitting circuit EC1 is activated in the odd frame and is deactivated in the even frames, and the second light emitting circuit EC2 is deactivated in the odd frame and is activated in the even frame, the overall exposure time of the narrow viewing angle area may be reduced to half.

The viewing angle controller 700 provides the first viewing angle signal VS1 and the second viewing angle signal VS2 to the pixels PX through the first viewing angle signal line VSL1 and the second viewing angle signal line VSL2. An additional scan driver for generating and outputting the first viewing angle signal VS1 and the second viewing angle signal VS2 may not be necessary. Accordingly, dead space and power consumption of the display device 1 may be reduced, while a resolution of the display device 1 may be increased.

Figure 7:
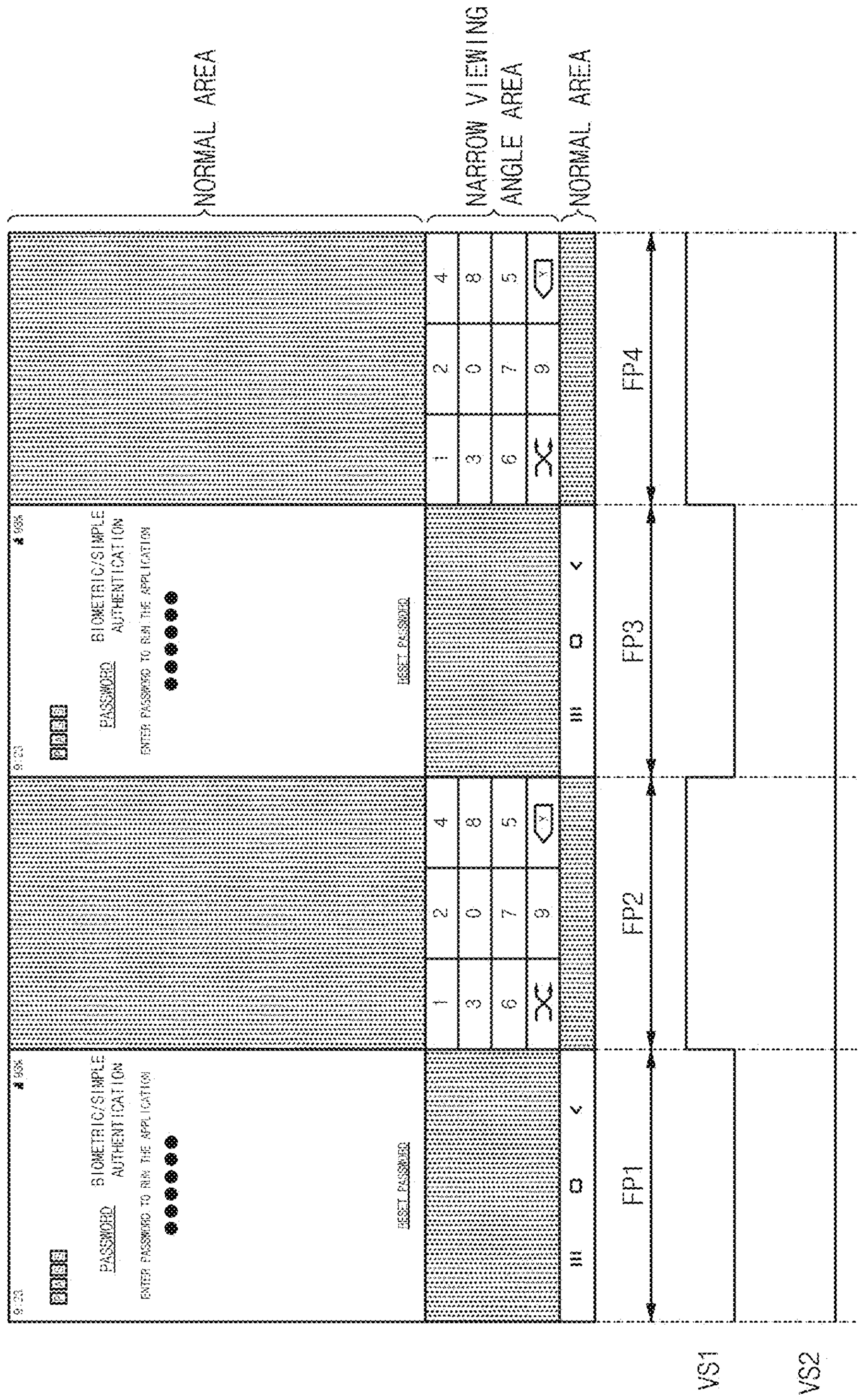
FIG. 7 is a timing diagram illustrating an operation of the pixel of FIG. 3 according to an embodiment of the present inventive concept.
Figure 8:
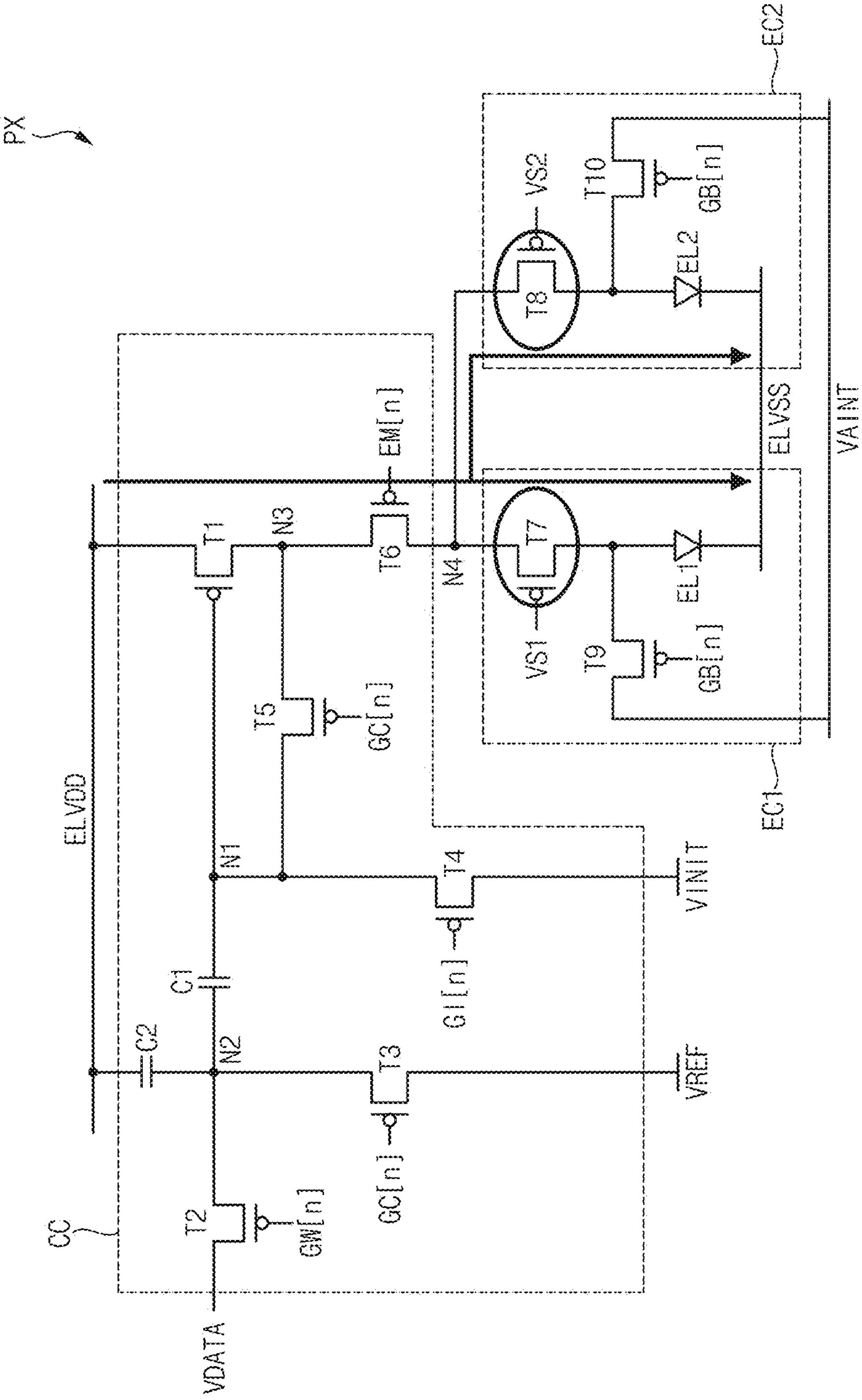
FIG. 8 is a circuit diagram illustrating an operation of the pixel of FIG. 3 in a first frame and a third frame of the timing diagram of FIG. 7.
Figure 9:
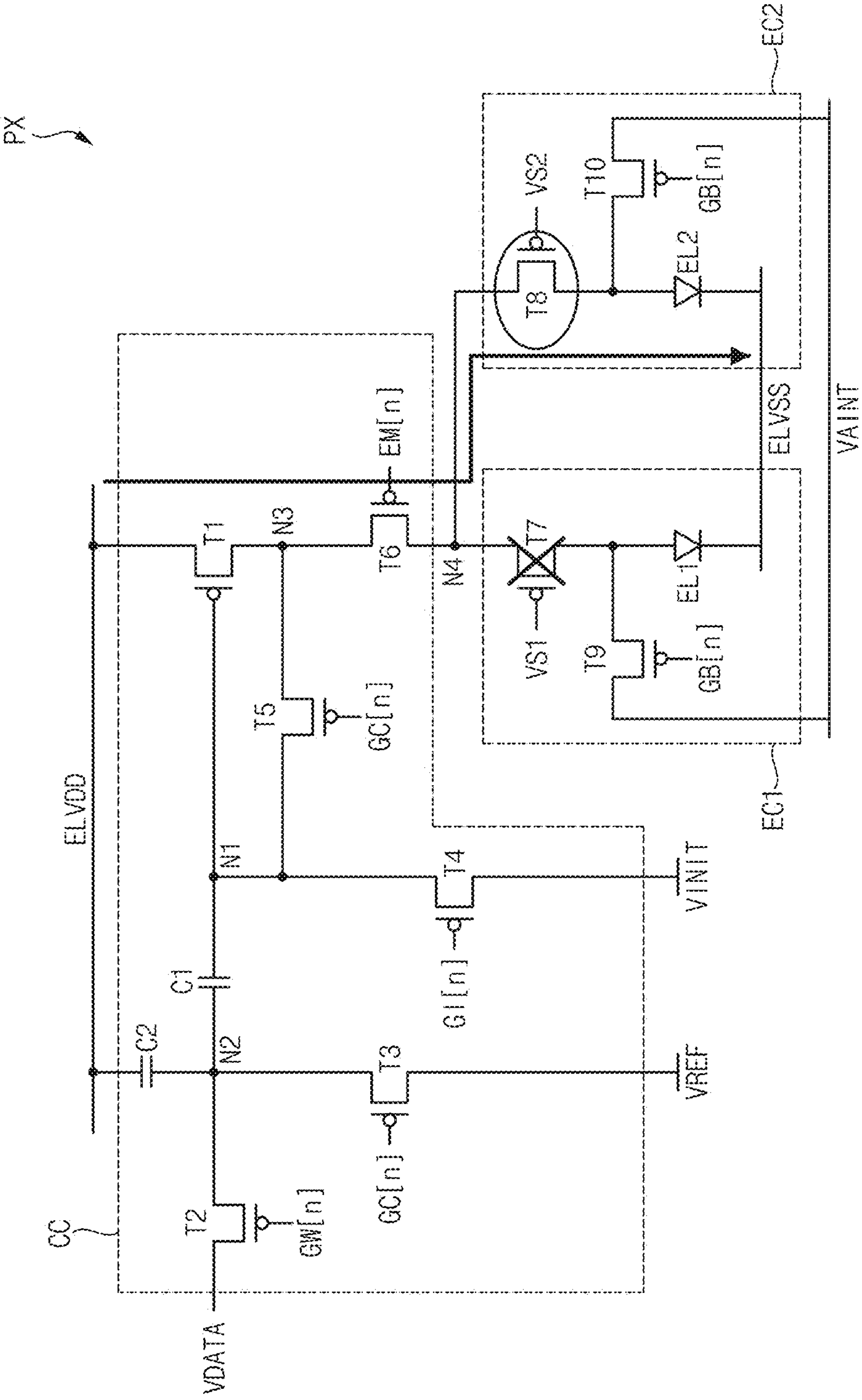
FIG. 9 is a circuit diagram illustrating an operation of the pixel of FIG. 3 in a second frame and a fourth frame of the timing diagram of FIG. 7.

FIG. 7 is a timing diagram illustrating an operation of the pixel PX of FIG. 3 according to an embodiment of the present inventive concept. FIG. 8 is a circuit diagram illustrating the operation of the pixel PX of FIG. 3 in the first frame FP1 and the third frame FP3 of the timing diagram of FIG. 7. FIG. 9 is a circuit diagram illustrating the operation of the pixel PX of FIG. 3 in the second frame FP2 and the fourth frame FP4 of the timing diagram of FIG. 7.

Referring to FIGS. 1, 3 and 7. the display panel 100 may display the odd frame and the even frame alternately in a normal area of the display panel 100 and a narrow viewing angle area of the display panel 100.

In the odd frame, the first viewing angle signal VS1 may have the activation level and the second viewing angle signal VS2 may have the activation level, where the activation level may be a logic low level and the deactivation level may be a logic high level. The odd frame may be first frame FP1 or the third frame FP3. The data driver 500 may output a normal image data voltage as the data voltage for the normal area, and may not provide the data voltage for the narrow viewing angle area. Alternatively, the data driver 500 may provide the normal image data voltage as the data voltage for the normal area, and provide a black image data voltage as the data voltage for the narrow viewing angle area.

In the even frame, the first viewing angle signal VS1 may have a deactivation level and the second viewing angle signal VS2 may have the activation level, where the activation level may be a logic low level and the deactivation level may be a logic high level. The even frame may be second frame FP2 or the fourth frame FP4. The data driver 500 may not provide the data voltage for the normal area, and may provide a narrow viewing angle image data voltage as the data voltage for the narrow viewing angle area. Alternatively, the data driver 500 may provide the black image data voltage as the data voltage for the normal area, and provide the narrow viewing angle image data voltage as the data voltage for the narrow viewing angle area.

Referring to FIGS. 3, 7 and 8, in the odd frame, both the first viewing angle signal VS1 and the second viewing angle signal VS2 may have the activation level, and the seventh transistor T7 and the eighth transistor T8 may be turned on, where the activation level may be a logic low level and the odd frame may be first frame FP1 or the third frame FP3. The driving current generated by the first transistor T1 may be transmitted to both the first light emitting circuit EC1 and the second light emitting circuit EC2. Both the first light emitting element EL1 of the first light emitting circuit EC1 and the second light emitting element EL2 of the second light emitting circuit EC2 may be turned on to emit a light by the driving current. A normal image may be displayed in the normal area of the display panel 100, and a black image may be output in the narrow viewing angle area of the display panel 100.

Because both the first light emitting element EL1 and the second light emitting element EL2 are turned to emit a light for the normal area based on the normal image data voltage, a luminance level of the normal area may be higher than a luminance level of the normal area when only the first light emitting element EL1 is turned on to emit a light.

Referring to FIGS. 3, 7 and 9, in the even frame, the first viewing angle signal VS1 may have the deactivation level, and the seventh transistor T7 may be turned off, where the deactivation level is a logic high level, and the even frame may be second frame FP2 or the fourth frame FP4. The second viewing angle signal VS2 may have the activation level and the eighth transistor T8 may be turned on. The driving current generated by the first transistor T1 may be transmitted to the second light emitting circuit EC2 and may not be transmitted to the first light emitting circuit EC1. The second light emitting element EL2 of the second light emitting circuit EC2 may be turned on to emit a light by the driving current while the first light emitting element EL1 of the first light emitting circuit EC1 may remain turned off. The viewing angle of the image displayed by the second light emitting element EL2 may be narrower than the viewing angle of the image displayed by the first light emitting element EL1. In the even frame, the normal image may not be displayed in the normal area of the display panel 100, and a narrow viewing angle image may be displayed in the narrow viewing angle area of the display panel 100. Alternatively, the black image may be displayed in the normal area of the display panel 100, and the narrow viewing angle image may be displayed in the narrow viewing angle area of the display panel 100.

Because the first light emitting circuit EC1 and the second light emitting circuit EC2 are alternately activated, the overall exposure time of the narrow viewing angle area may be reduced. More particularly, because both the first light emitting circuit EC1 and the second light emitting circuit EC2 is activated in the odd frame, and the first light emitting circuit EC1 is deactivated in the even frame and the second light emitting circuit EC2 is activated in the even frame, the overall exposure time of the narrow viewing angle area may be reduced.

The viewing angle controller 700 provides the first viewing angle signal VS1 and the second viewing angle signal VS2 to the pixels PX through the first viewing angle signal line VSL1 and the second viewing angle signal line VSL2. The additional scan driver for generating and outputting the first viewing angle signal VS1 and the second viewing angle signal VS2 may not be necessary. Accordingly, dead space and power consumption of the display device 1 may be reduced, while a resolution of the display device 1 may be increased.

Figure 10:
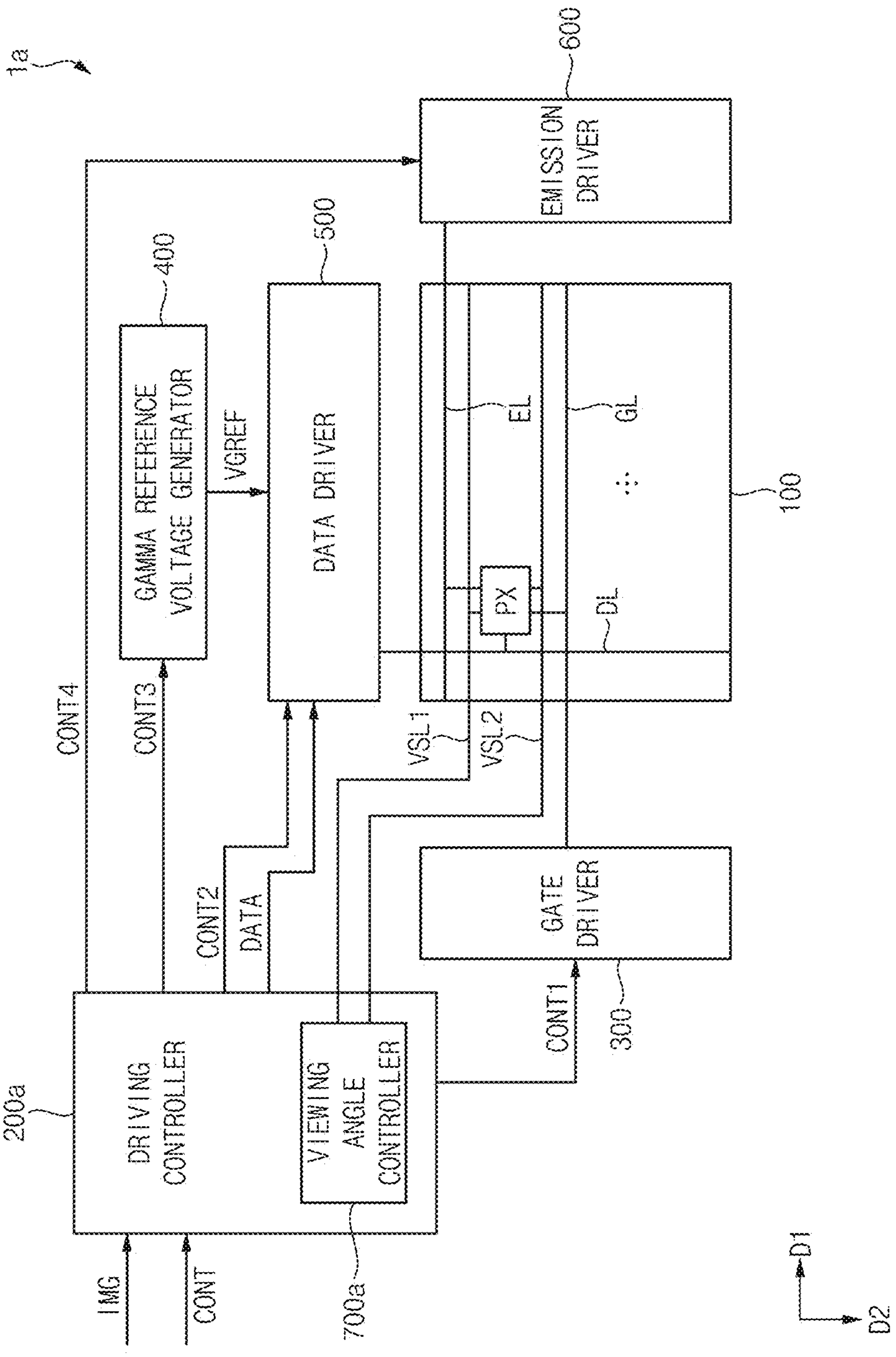
FIG. 10 is a block diagram illustrating a display device according to an embodiment of the present inventive concept.

FIG. 10 is a block diagram illustrating a display device 1*a* according to an embodiment of the present inventive concept.

The display device 1*a* is substantially same as the display device 1 of the embodiment explained referring to FIG. 1 except that a viewing angle controller 700*a* is included in a driving controller 200*a*.

The viewing angle controller 700*a* may be embedded in the driving controller 200*a*. The driving controller 200*a* may provide the pixels PX with the first viewing angle signal VS1 and the second viewing angle signal VS2 to control the viewing angle of the display panel 100. The plurality of pixels PX may receive first viewing angle signal VS1 and the second viewing angle signal VS2 from the driving controller 200*a*.

The driving controller 200*a* may provide the plurality of pixels PX with the first viewing angle signal VS1 and the second viewing angle signal VS2 through the first viewing angle signal line VSL1 and the second viewing angle signal line VSL2 to control the viewing angle of the display panel 100.

An additional scan driver for generating and outputting the first viewing angle signal VS1 and the second viewing angle signal VS2 may not be necessary. Accordingly, dead space and power consumption of the display device 1*a* may be reduced, while resolution of the display device 1*a* may be increased.

Figure 11:
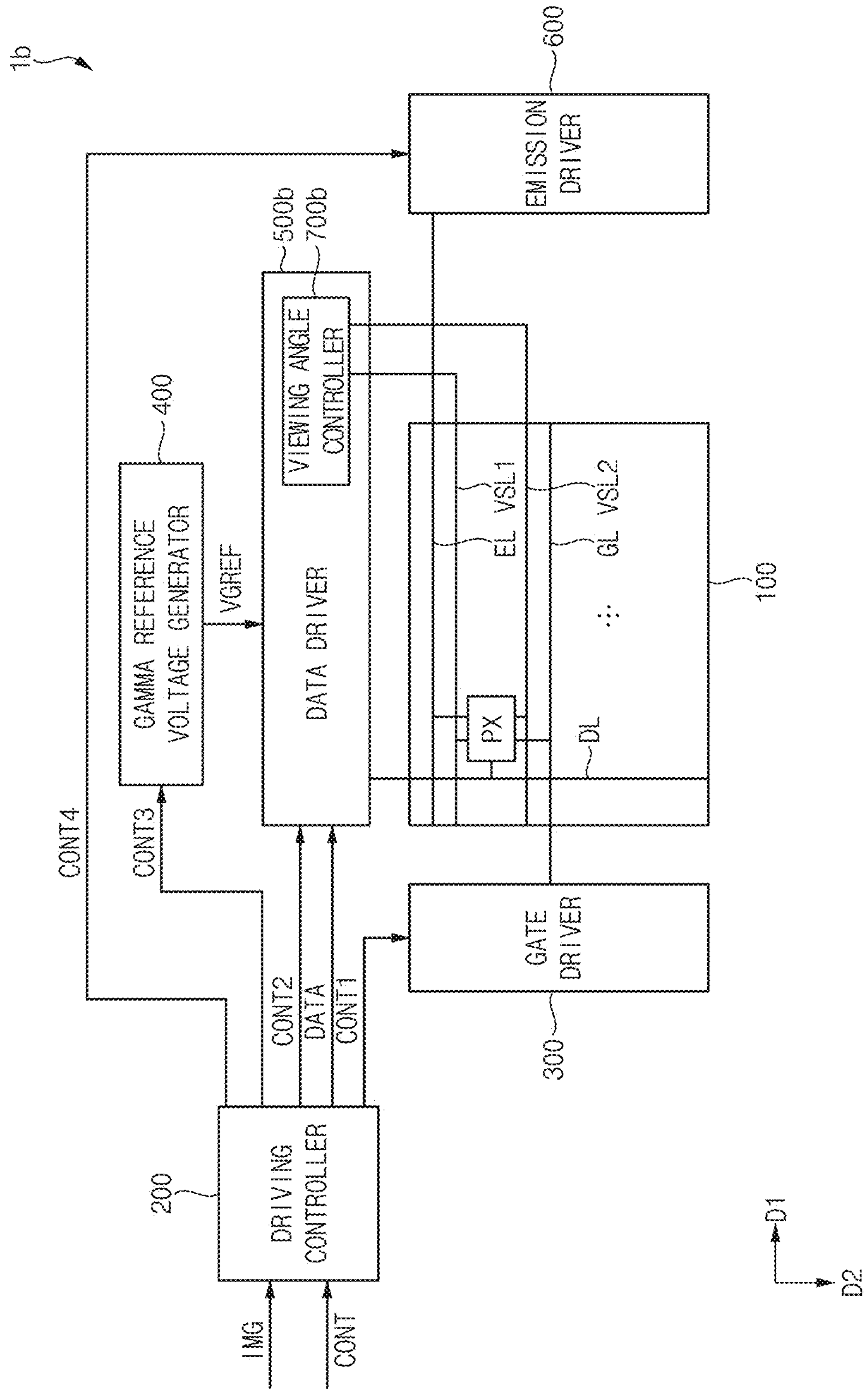
FIG. 11 is a block diagram illustrating a display device according to an embodiment of the present inventive concept.

FIG. 11 is a block diagram illustrating a display device 1*b* according to an embodiment of the present inventive concept.

The display device 1*b* is substantially same as the display device 1 of the embodiment explained referring to FIG. 1 except that a viewing angle controller 700*b* is embedded in a data driver 500*b*.

The data driver 500*b* may provide the plurality of pixels PX with the first viewing angle signal VS1 and the second viewing angle signal VS2 through the first viewing angle signal line VSL1 and the second viewing angle signal line VSL2 to control the viewing angle of the display panel 100.

An additional scan driver for generating and outputting the first viewing angle signal VS1 and the second viewing angle signal VS2 may not be necessary. Accordingly, dead space and power consumption of the display device 1*b* may be reduced, while the resolution of the display device 1*b* may be increased.

Figure 12:
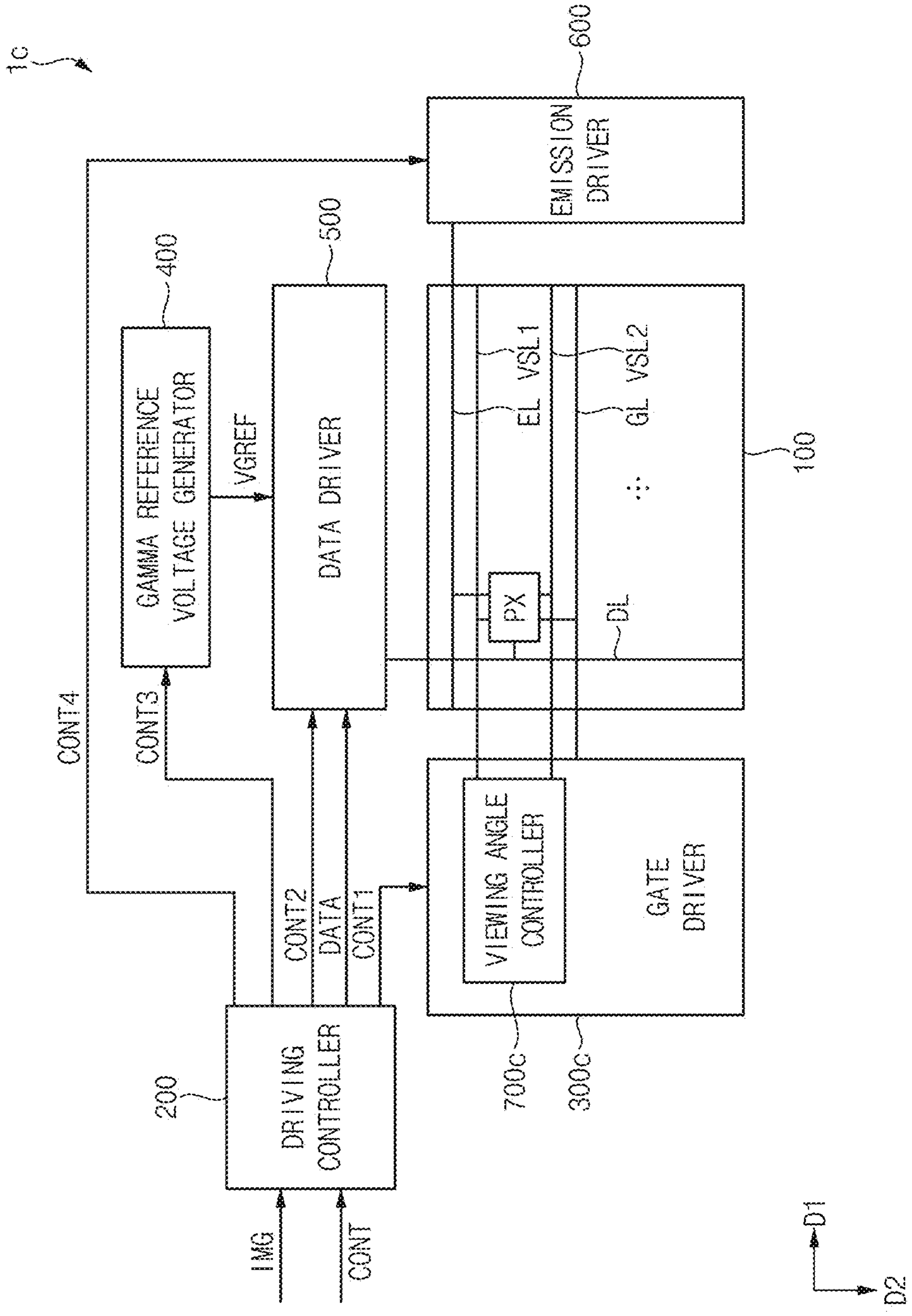
FIG. 12 is a block diagram illustrating a display device according to an embodiment of the present inventive concept.

FIG. 12 is a block diagram illustrating a display device 1*c* according to an embodiment of the present inventive concept.

The display device 1*c* is substantially same as the display device 1 of the embodiment explained referring to FIG. 1 except that a viewing angle controller 700*c* is embedded in a gate driver 300*c*.

The gate driver 300*c* may provide the pixels PX with the first viewing angle signal VS1 and the second viewing angle signal VS2 through the first viewing angle signal line VSL1 to control the viewing angle of the display panel 100.

An additional scan driver for generating and outputting the first viewing angle signal VS1 and the second viewing angle signal VS2 may not be necessary. Accordingly, dead space and power consumption of the display device 1*c* may be reduced, while the resolution of the display device 1*c* may be increased.

Figure 13:
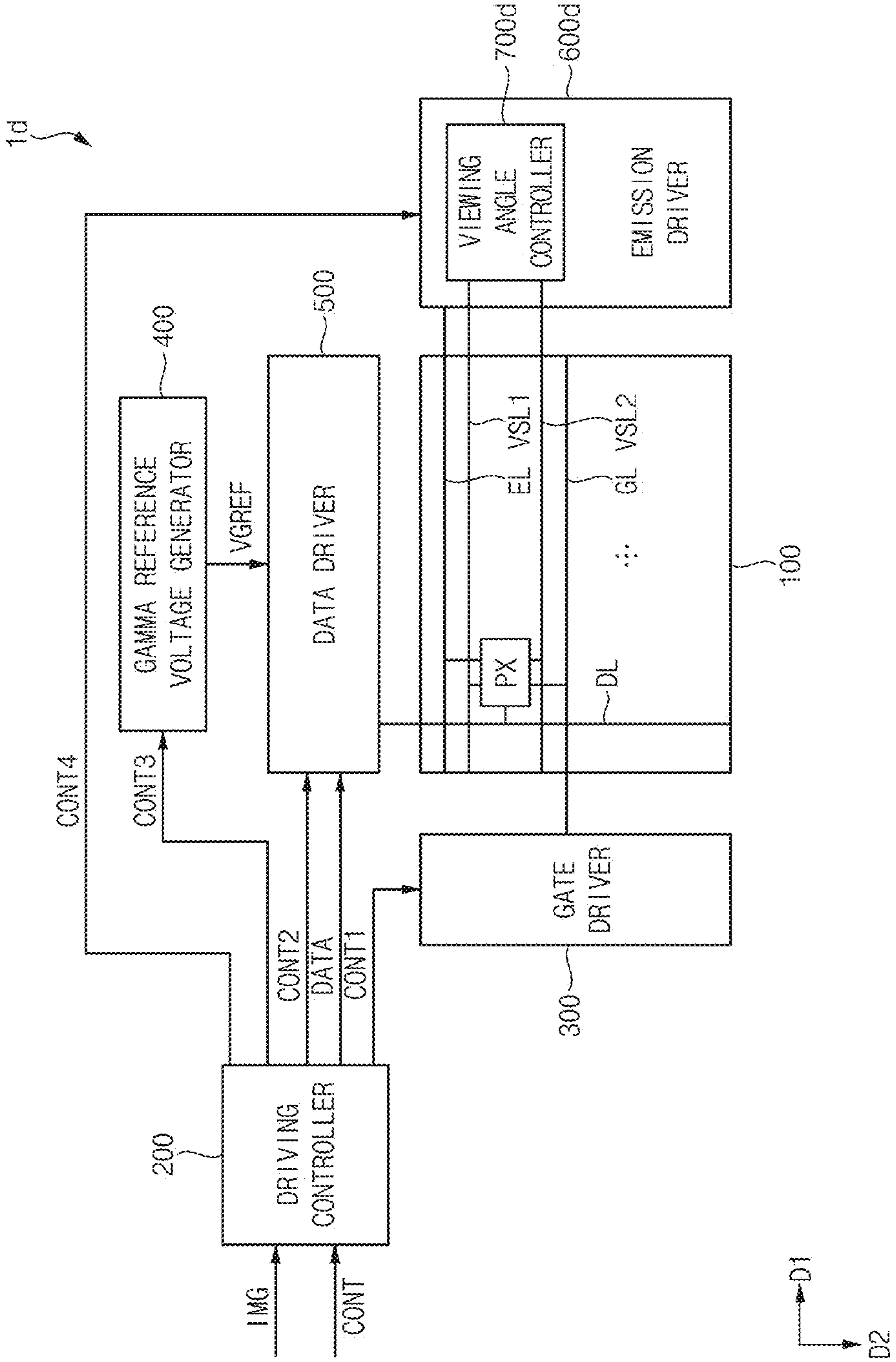
FIG. 13 is a block diagram illustrating a display device according to an embodiment of the present inventive concept.

FIG. 13 is a block diagram illustrating a display device 1*d* according to an embodiment of the present inventive concept.

The display device 1*d* is substantially same as the display device 1 of the embodiment explained referring to FIG. 1 except that a viewing angle controller 700*d* is embedded in an emission driver 600*d*.

The emission driver 600*d* may provide the pixels PX with the first viewing angle signal VS1 and the second viewing angle signal VS2 through the first viewing angle signal line VSL1 and the second viewing angle signal line VSL2 to control the viewing angle of the display panel 100.

An additional scan driver for generating and outputting the first viewing angle signal VS1 and the second viewing angle signal VS2 may not be necessary. Accordingly, dead space and power consumption of the display device 1*d* may be reduced, while the resolution of the display device 1*d* may be increased.

Figure 14:
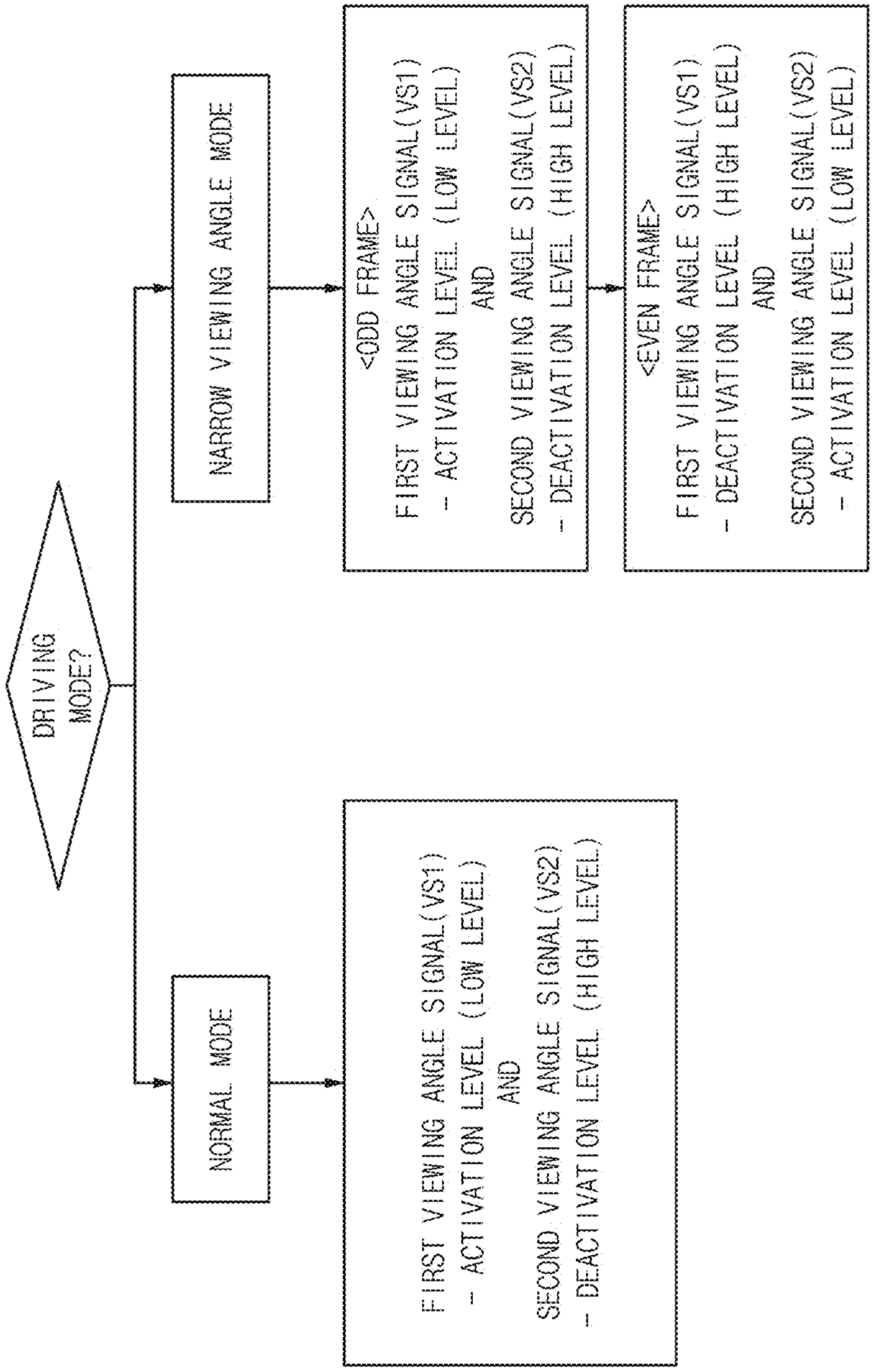
FIG. 14 is a flowchart diagram illustrating a driving mode of a display device according to an embodiment of the present inventive concept.

FIG. 14 is a flowchart diagram illustrating a driving mode of the display device 1 according to an embodiment of the present inventive concept.

Referring to FIGS. 1, 3 and 14, the display device 1 may operate in one of a normal mode and a narrow viewing angle mode.

In the normal mode, the first viewing angle signal VS1 may have the activation level and the second viewing angle signal VS2 may have the deactivation level regardless of the frame order. For example, the first viewing angle signal VS1 may have the activation level in the odd frame and the even frame of the normal mode, and the second viewing angle signal VS2 may have deactivation level in the odd frame and the even frame of the normal mode. The activation level may be a logic low level and the deactivation level is a logic high level.

In the normal mode, the seventh transistor T7 may be turned on, and the eighth transistor T8 may be turned off. Accordingly, the first light emitting circuit EC1 may be activated and the first light emitting element EL1 may be turned on to emit a light, and the second light emitting circuit EC2 may be deactivated and the second light emitting element EL2 may remain turned off.

The display panel 100 may display the normal area in the normal mode.

In the narrow viewing angle mode, the display panel 100 may display different images based on different frame order. In the odd frame, the first viewing angle signal VS1 may have the activation level, and the second viewing angle signal VS2 may have the deactivation level, where the activation level may be a logic low level and the deactivation level is a logic high level. The seventh transistor T7 may be turned on by the first viewing angle signal VS1, and the eighth transistor T8 may be turned off by the second viewing angle signal VS2. Accordingly, The driving current generated by the first transistor T1 may be transmitted to the first light emitting circuit EC1 and may not be transmitted to the second light emitting circuit EC2. The first light emitting element EL1 of the first light emitting circuit EC1 may be turned on to emit a light by the driving current while the second light emitting element EL2 of the second light emitting circuit EC2 may remain turned off, and the normal image may be displayed in the normal area of the display panel 100, and the narrow viewing angle image may not be displayed in the narrow viewing angle area. Alternatively, the normal image may be displayed in the normal area of the display panel 100, and the black image may be displayed in the narrow viewing angle area.

In the even frame of the narrow viewing angle mode, the first viewing angle signal VS1 may have the deactivation level and the second viewing angle signal VS2 may have the activation level, where the activation level may be a logic low level and the deactivation level is a logic high level. The seventh transistor T7 may be turned off by the first viewing angle signal VS1, and the eighth transistor T8 may be turned on by the second viewing angle signal VS2. Accordingly, the driving current generated by the first transistor T1 may be transmitted to the second light emitting circuit EC2 and may not be transmitted to the first light emitting circuit EC1. The second light emitting element EL2 of the second light emitting circuit EC2 may be turned on to emit a light by the driving current while the first light emitting element EL1 of the first light emitting circuit EC1 may remain turned off. The normal image may not be displayed in the normal area of the display panel 100, and the narrow viewing angle image may be displayed in the narrow viewing angle area. Alternatively, the black image may be displayed in the normal area of the display panel 100, and the narrow viewing angle image may be displayed in the narrow viewing angle area.

Because the first light emitting circuit EC1 and the second light emitting circuit EC2 are alternately activated, the overall exposure time of the narrow viewing angle area may be reduced.

Figure 15:
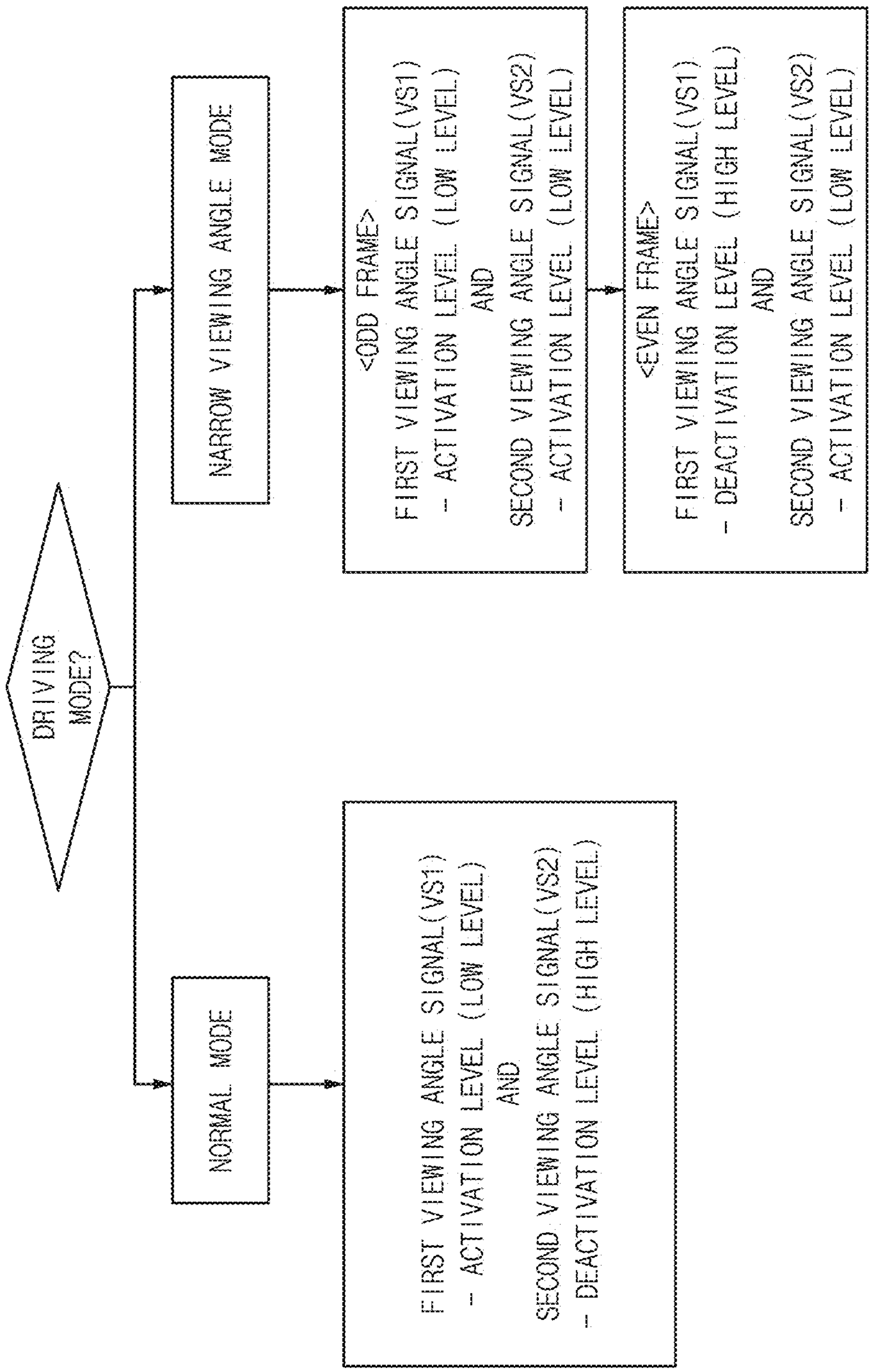
FIG. 15 is a flowchart diagram illustrating a driving mode of a display device according to an embodiment of the present inventive concept.

FIG. 15 is a flowchart diagram illustrating a driving mode of the display device 1 according to an embodiment of the present inventive concept.

A driving mode of display device 1 according to the present embodiment is substantially same as the driving mode of the display device 1 described referring to FIG. 14 except that the second viewing angle signal VS2 has the activation level in the odd frame of the narrow viewing angle mode, where the activation level may be a logic low level.

In the odd frame of the narrow viewing angle mode, both the first viewing angle signal VS1 and the second viewing angle signal VS2 may have the activation level, where the activation level may be a logic low level. The seventh transistor T7 and the eighth transistor T8 may be turned on by the first viewing angle signal VS1 and the second viewing angle signal VS2. Accordingly, the driving current generated by the first transistor T1 may be divided and transmitted to the first light emitting circuit EC1 and to the second light emitting circuit EC2. Both the first light emitting element EL1 and the second light emitting element EL2 may be turned on to emit a light based on the divided driving current.

The first light emitting element EL1 and the second light emitting element EL2 may be turned to emit a light based on the normal image data voltage for the normal area. Because the driving current is divided, the luminance level of the normal area may be lower compared to a luminance level of the normal area when only the first light emitting element EL1 is turned to emit a light.

In the even frame of the narrow viewing angle mode, the first light emitting circuit EC1 is deactivated, and the second light emitting circuit EC2 is activated. The viewing angle of the narrow viewing angle area may be narrower than the viewing angle of the normal area. Accordingly, the overall exposure time of the narrow viewing angle area may be reduced.

Figure 16:
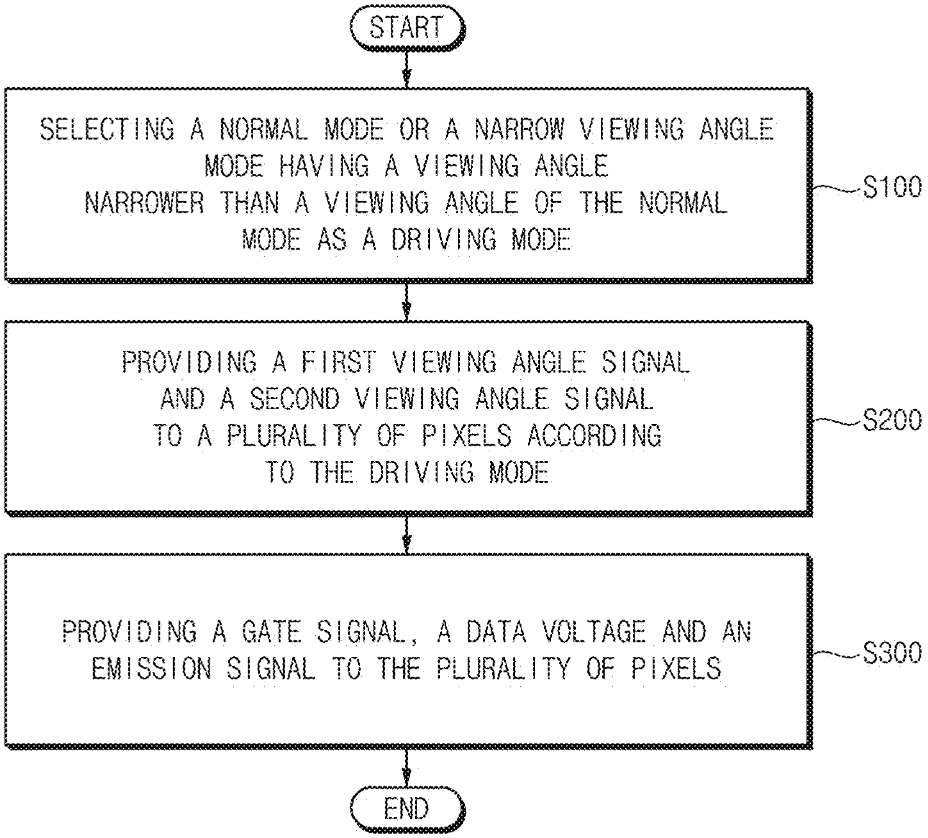
FIG. 16 is a flowchart diagram illustrating a method of operating a display device according to an embodiment of the present inventive concept.

FIG. 16 is a flowchart diagram illustrating a method of operating the display device 1 according to an embodiment of the present inventive concept.

Referring to FIGS. 1 to 3 and 14 to 16, the method of operating the display device 1 may include selecting one of the normal mode and the narrow viewing angle mode as the driving mode, where a viewing angle of the display device 1 in the narrow viewing angle mode may be narrower than the viewing angle of the display device 1 in the normal mode S100, providing the plurality of pixels PX with the first viewing angle signal VS1 and the second viewing angle signal VS2 according to the driving mode S200, and providing the plurality of pixels PX with the gate signal, the data voltage and the emission signal S300.

According to the selecting one of the normal mode and the narrow viewing angle mode as the driving mode S100, the viewing angle controller 700 may generate the first viewing angle signal VS1 and the second viewing angle signal VS2 based on the selected driving mode.

According to an embodiment, in the normal mode, the first viewing angle signal VS1 may have the activation level and the second viewing angle signal VS2 may have the deactivation level regardless of the frame order, where the activation level may be a logic low level and the deactivation level is a logic high level.

In the odd frame of the narrow viewing angle mode, the first viewing angle signal VS1 may have the activation level and the second viewing angle signal VS2 may have the deactivation level. In the even frame of the narrow viewing angle mode, the first viewing angle signal VS1 may have the deactivation level and the second viewing angle signal VS2 may have the activation level. The activation level may be a logic low level and the deactivation level is a logic high level.

For providing the first viewing angle signal VS1 and the second viewing angle signal VS2 to the plurality of pixels PX according to the driving mode S200, the viewing angle controller 700 may provide the pixels PX with the first viewing angle signal VS1 and the second viewing angle signal VS2 through the first viewing angle signal line VSL1 and the second viewing angle signal line VSL2. The seventh transistor T7 of the pixel PX may be turned on and/or turned off based on a logic level of the first viewing angle signal VS1. The eighth transistor T8 of the pixels PX may be turned on and/or turned off based on a logic level of the second viewing angle signal VS2.

According to an embodiment, in the normal mode, the first viewing angle signal VS1 may have the activation level and the second viewing angle signal VS2 may have the deactivation level regardless of the frame order. Accordingly, the seventh transistor T7 may be turned on and the eighth transistor T8 may be turned off. The first light emitting circuit EC1 may be activated, and the first light emitting element EL1 may be turned on to emit a light. The second light emitting circuit EC2 may be deactivated, and the second light emitting element EL2 may remain turned off.

In the odd frame of the narrow viewing angle mode, the first viewing angle signal VS1 may have the activation level and the second viewing angle signal VS2 may have the deactivation level, where the activation level may be a logic low level and the deactivation level is a logic high level. The seventh transistor T7 may be turned on by the first viewing angle signal VS1, and the eighth transistor T8 may be turned off by the second viewing angle signal VS2. Accordingly, the driving current generated by the first transistor T1 may be transmitted to the first light emitting circuit EC1 and may not be transmitted to the second light emitting circuit EC2. The first light emitting element EL1 of the first light emitting circuit EC1 may be turned on to emit a light by the driving current, and the second light emitting element EL2 of the second light emitting circuit EC2 may remain turned off.

In the even frame of the narrow viewing angle mode, the first viewing angle signal VS1 may have the deactivation level and the second viewing angle signal VS2 may have the activation level, where the activation level may be a logic low level and the deactivation level is a logic high level. The seventh transistor T7 may be turned off by the first viewing angle signal VS1, and the eighth transistor T8 may be turned on by the second viewing angle signal VS2. Accordingly, the driving current generated by the first transistor T1 may be transmitted to the second light emitting circuit EC2 and may not be transmitted to the first light emitting circuit EC1. The second light emitting element EL2 of the second light emitting circuit EC2 may be turned on to emit a light by the driving current while the first light emitting element EL1 of the first light emitting circuit EC1 may remain turned off.

In the odd frame of the narrow viewing angle mode, the first viewing angle signal VS1 may have the activation level and the second viewing angle signal VS2 may have the activation level, where the activation level may be a logic low level and the deactivation level is a logic high level. The seventh transistor T7 may be turned on by the first viewing angle signal VS1 and the eighth transistor T8 may be turned on by the second viewing angle signal VS2. Accordingly, the driving current generated by the first transistor T1 may be transmitted to both the first light emitting circuit EC1 and the second light emitting circuit EC2. The first light emitting element EL1 of the first light emitting circuit EC1 and the second light emitting element EL2 of the second light emitting circuit EC2 may be turned on to emit a light.

The first light emitting element EL1 and the second light emitting element EL2 may be turned on to emit a light based on the normal image data voltage for the normal area. Because both the first light emitting element EL1 and the second light emitting element EL2 may be turned on, a luminance level of the display device 1 in the normal area may be higher compared to a luminance level of the display device 1 in the normal area when only the first light emitting element EL1 is turned on to emit a light.

In the even frame of the narrow viewing angle mode, the first viewing angle signal VS1 may have the deactivation level and the second viewing angle signal VS2 may have the activation level, where the activation level may be a logic low level and the deactivation level may be a logic high level. The seventh transistor T7 may be turned off by the first viewing angle signal VS1, and the eighth transistor T8 may be turned on by the second viewing angle signal VS2. Accordingly, the driving current generated by the first transistor T1 may be transmitted to the second light emitting circuit EC2 and may not be transmitted to the first light emitting circuit EC1. The second light emitting element EL2 of the second light emitting circuit EC2 may be turned on to emit a light by the driving current while the first light emitting element EL1 of the first light emitting circuit EC1 may remain turned off.

For providing the gate signal, the data voltage and the emission signal to the pixels PX S300, the gate driver 300 may provide the display panel 100 with the gate signal, and the data voltage VDATA, and the emission driver 600 may provide the emission signal EM to the display panel 100 according to the driving mode.

Because the levels of the first viewing angle signal VS1 and the second viewing angle signal VS2 are controlled in the narrow viewing angle mode, the viewing angle of the display device 1 in the narrow viewing angle area may be narrower than the viewing angle of the display device 1 in the normal area. Accordingly, overall exposure time of the narrow viewing angle area may be reduced.

The viewing angle controller 700 provides the first viewing angle signal VS1 and the second viewing angle signal VS2 to the plurality of pixels PX through the first viewing angle signal line VSL1 and the second viewing angle signal line VSL2. The additional scan driver for generating and outputting the first viewing angle signal VS1 and the second viewing angle signal VS2 may not be necessary. Accordingly, dead space and power consumption of the display device 1 may be reduced while the resolution of the display device 1 may be increased.

Figure 17:
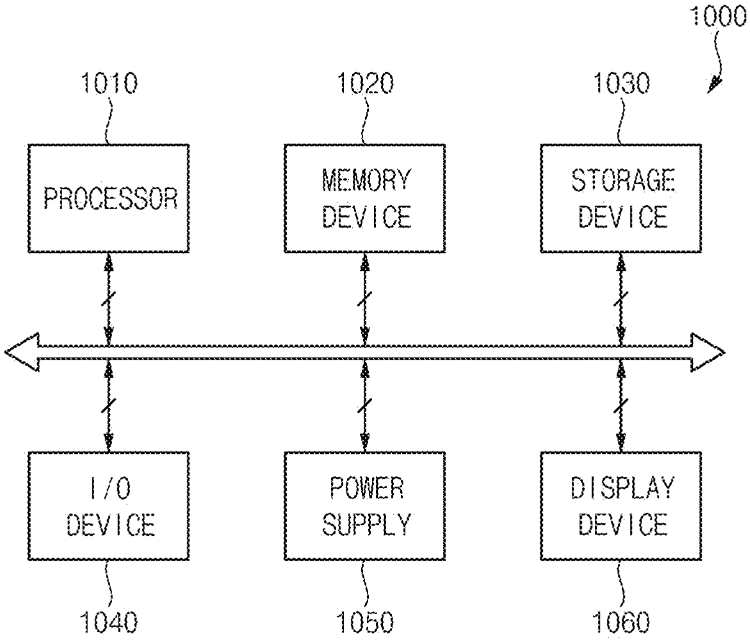
FIG. 17 is a block diagram illustrating an electronic device according to an embodiment of the present inventive concept.
Figure 18:
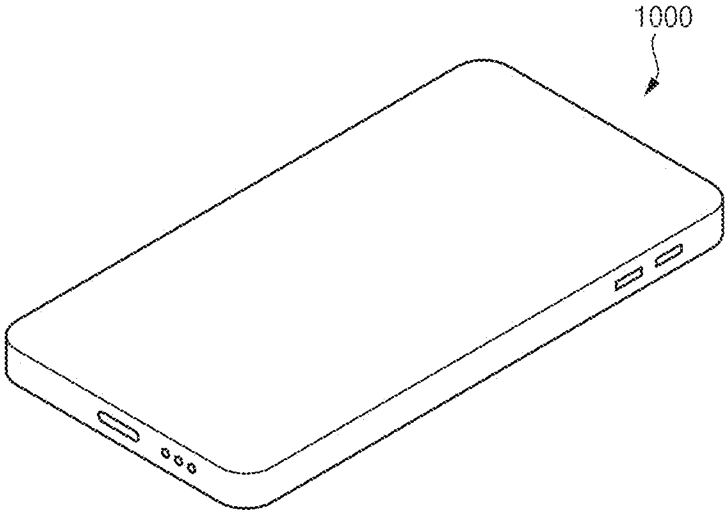
FIG. 18 is a diagram illustrating a smart phone as an example of the electronic device of FIG. 17.

FIG. 17 is a block diagram illustrating an electronic device 1000 according to an embodiment of the present inventive concept. FIG. 18 is a diagram illustrating a smart phone as an example of the electronic device of FIG. 17.

Referring to FIGS. 17 and 18, the electronic device 1000 may include a processor 1010, a memory device 1020, a storage device 1030, an input/output (I/O) device 1040, a power supply 1050, and a display device 1060. The display device 1060 may be the display device of FIG. 1. In addition, the electronic device 1000 may further include ports for communicating with a video card, a sound card, a memory card, a universal serial bus (USB) device, and other electronic device.

The input/output (IO) device 1040 may sense user input via touch or cursor select of an icon presented on the display panel, wherein the processor is caused to execute one of the normal viewing angle mode or the narrow viewing angle mode of the display device upon receipt of the user input.

The display panel of the display device 1060 may include a normal viewing angle area and a narrow viewing angle area, and when the processor 1010 is caused to execute first viewing angle mode, the viewing angle of the normal viewing angle area and the viewing angle of the narrow viewing angle area are substantially same, and when the processor 1010 is caused to execute second viewing angle mode, the viewing angle of the narrow viewing angle area is narrower than the viewing angle of the normal viewing angle area.

The input/output (IO) device 1040 may be a touch screen embedded in the display panel, and the touch screen may include touch sensors for sensing a touch or a tap by an user.

As illustrated in FIG. 18, the electronic device 1000 may be a smart phone. However, the electronic device 1000 is not limited thereto. For example, the electronic device 1000 may be a television, a monitor, a cellular phone, a video phone, a smart pad, a smart watch, a tablet PC, a car navigation system, a laptop, and a head mounted display (HMD) device.

The processor 1010 may perform various computing functions. The processor 1010 may be a microprocessor, a central processing unit (CPU), and an application processor (AP). The processor 1010 may be coupled to other components via an address bus, a control bus, and a data bus. The processor 1010 may be coupled to an extended bus such as a peripheral component interconnection (PCI) bus.

The processor 1010 may provide the input image data IMG and the input control signal CONT to the driving controller 200 of FIG. 1.

The memory device 1020 may store data for operating the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, and a mobile DRAM device.

The storage device 1030 may include a solid state drive (SSD) device, a hard disk drive (HDD) device, and a CD-ROM device.

The I/O device 1040 may include an input device such as a keyboard, a keypad, a mouse device, a touch-pad, and a touch-screen, and an output device such as a printer, and a speaker. The I/O device 1040 may include the display device 1060.

The power supply 1050 may supply a power for operating the electronic device 1000.

The display device 1060 may be connected to other components through buses or other communication links.

The inventive concepts may be applied to any display device and any electronic device including the touch panel. For example, the inventive concepts may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, and a navigation device.

The illustration of the inventive concept and is not to be construed as limiting thereof. Although several embodiments of the inventive concept have been described, those skilled in the art will readily apprehend that many modifications are possible in the embodiments without materially departing from the novel teachings and advantages of the inventive concept. Accordingly, such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the illustration of the inventive concept is not to be construed as limited to the specific embodiments disclosed, and modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including a plurality of pixels;

a gate driver configured to generate a gate signal for providing the plurality of pixels with the gate signal;

a data driver configured to generate a data voltage for providing the plurality of pixels with the data voltage;

an emission driver configured to generate an emission signal for providing the plurality of pixels with the emission signal;

a driving controller configured to generate display image data based on input image data; and a viewing angle controller configured to generate a first viewing angle signal and a second viewing angle signal for providing the plurality of pixels with the first viewing angle signal and the second viewing angle signal, wherein the display image data are alternately displayed on the display panel with different viewing angles in response to the first viewing angle signal and the second viewing angle signal, wherein each of the plurality of pixels includes:

a first light emitting circuit including a first light emitting element and a first viewing angle control transistor, in which the first viewing angle control transistor is turned on in response to the first viewing angle signal for transmitting a driving current to the first light emitting element; and a second light emitting circuit including a second light emitting element and a second viewing angle control transistor, in which the second viewing angle control transistor is turned on in response to the second viewing angle signal for transmitting the driving current to the second light emitting element, wherein a viewing angle of the second light emitting circuit is narrower than a viewing angle of the first light emitting circuit, wherein, the display device is configured to operate in one of a normal mode and a narrow viewing angle mode, and in the normal mode, the first viewing angle signal has an activation level and the second viewing angle signal has a deactivation level in odd and even frames, in which the odd frame is an odd-numbered frame among a series of frames and the even frame is an even-numbered frame among the series of frames, and, in the narrow viewing angle mode, both the first viewing angle signal and the second viewing angle signal have the activation level in the odd frame, and the first viewing angle signal has the deactivation level and the second viewing angle signal has the activation level in the even frame.

2. The display device of claim 1, wherein each of the plurality of pixels is configured to receive the first viewing angle signal and the second viewing angle signal through a first viewing angle signal line and a second viewing angle signal line respectively.

3. The display device of claim 2, wherein each of the plurality of pixels includes a compensation circuit, and the compensation circuit includes:

a data writing transistor configured to receive the data voltage;

a driving transistor configured to generate a driving current corresponding to the data voltage; and an emission transistor configured to transmit the driving current to the first light emitting circuit and the second light emitting circuit in response to the emission signal, wherein the compensation circuit is configured to compensate a threshold voltage of the driving transistor.

4. The display device of claim 3, wherein the gate electrode of the first viewing angle control transistor is connected to the first viewing angle signal line, a source electrode of the first viewing angle control transistor is connected to the compensation circuit, and a drain electrode of the first viewing angle control transistor is connected to an anode electrode of the first light emitting element, and the gate electrode of the second viewing angle control transistor is connected to the second viewing angle signal line, a source electrode of the second viewing angle control transistor is connected to the compensation circuit, and a drain electrode of the second viewing angle control transistor is connected to an anode electrode of the second light emitting element.

5. The display device of claim 4, wherein the gate electrode of the emission transistor receives the emission signal, a source electrode of the emission transistor is connected to a drain electrode of the driving transistor and a drain electrode of the emission transistor is connected to the source electrode of the first viewing angle control transistor, and the source electrode of the second viewing angle control transistor is connected to the drain electrode of the emission transistor.

6. The display device of claim 1, wherein the first viewing angle signal has an activation level and the second viewing angle signal has a deactivation level in an odd frame, in which the odd frame is odd-numbered frame among a series of frames, and the first viewing angle signal has a deactivation level and the second viewing angle signal has an activation level in an even frame, in which the even frame is even-numbered frame among the series of frames.

7. The display device of claim 6, wherein, in the odd frame, the first viewing angle signal has a logic low level and the second viewing angle signal has a logic high level, and, in the even frame, the first viewing angle signal has a logic high level and the second viewing angle signal has a logic low level.

8. The display device of claim 1, wherein, in an odd frame, the first viewing angle signal has an activation level and the second viewing angle signal has an activation level, in which the odd frame is odd-numbered frame among a series of frames, and, in an even frame, the first viewing angle signal has a deactivation level and the second viewing angle signal has an activation level, in which the even frame is even-numbered frame among the series of frames.

9. The display device of claim 8, wherein, in the odd frame, the first viewing angle signal has a logic low level and the second viewing angle signal has a logic low level, and, in the even frame, the first viewing angle signal has a logic high level and the second viewing angle signal has a logic low level.

10. The display device of claim 1, wherein the viewing angle controller is embedded in one of the gate driver, the data driver, the emission driver and the driving controller.

11. A display device comprising:
- a display panel including a plurality of pixels;
- a gate driver configured to generate a gate signal for providing the plurality of pixels with the gate signal;
- a data driver configured to generate a data voltage for providing the plurality of pixels with the data voltage;
- an emission driver configured to generate an emission signal for providing the plurality of pixels with the emission signal;
- a driving controller configured to generate display image data based on input image data; and
- a viewing angle controller configured to generate a first viewing angle signal and a second viewing angle signal for providing the plurality of pixels with the first viewing angle signal and the second viewing angle signal,
- wherein the display image data are alternately displayed on the display panel with different viewing angles in response to the first viewing angle signal and the second viewing angle signal,
- wherein each of the plurality of pixels includes:
  - a first light emitting circuit including a first light emitting element and a first viewing angle control transistor, in which the first viewing angle control transistor is turned on in response to the first viewing angle signal for transmitting a driving current to the first light emitting element; and
  - a second light emitting circuit including a second light emitting element and a second viewing angle control transistor, in which the second viewing angle control transistor is turned on in response to the second viewing angle signal for transmitting the driving current to the second light emitting element,
- wherein a viewing angle of the second light emitting circuit is narrower than a viewing angle of the first light emitting circuit, and
- wherein the display device is configured to operate in one of a normal mode and a narrow viewing angle mode, in which a viewing angle in the narrow viewing angle mode is narrower than a viewing angle in the normal mode,
- wherein, in the normal mode, the first viewing angle signal has an activation level and the second viewing angle signal has a deactivation level in the odd and even frames, in which the odd frame is an odd-numbered frame among a series of frames and the even frame is an even-numbered frame among the series of frames, and, in the narrow viewing angle mode, the first viewing angle signal has the activation level and the second viewing angle signal has the deactivation level in the odd frame, and the first viewing angle signal has the deactivation level and the second viewing angle signal has the activation level in the even frame.

12. The display device of claim 11, wherein, in the normal mode, the first viewing angle signal has a logic low level and the second viewing angle signal has a logic high level in the odd and even frames, and, in the narrow viewing angle mode, the first viewing angle signal has a logic low level and the second viewing angle signal has a logic high level in the odd frame, and the first viewing angle signal has a logic high level and the second viewing angle signal has a logic low level in the even frame.

13. The display device of claim 11, wherein each of the plurality of pixels is configured to receive the first viewing angle signal and the second viewing angle signal through a first viewing angle signal line and a second viewing angle signal line respectively.

14. The display device of claim 13, wherein each of the plurality of pixels includes a compensation circuit, and the compensation circuit includes:
- a data writing transistor configured to receive the data voltage;
- a driving transistor configured to generate a driving current corresponding to the data voltage; and
- an emission transistor configured to transmit the driving current to the first light emitting circuit and the second light emitting circuit in response to the emission signal, and
- wherein the compensation circuit is configured to compensate a threshold voltage of the driving transistor.

15. The display device of claim 14, wherein the gate electrode of the first viewing angle control transistor is connected to the first viewing angle signal line, a source electrode of the first viewing angle control transistor is connected to the compensation circuit, and a drain electrode of the first viewing angle control transistor is connected to an anode electrode of the first light emitting element, and the gate electrode of the second viewing angle control transistor is connected to the second viewing angle signal line, a source electrode of the second viewing angle control transistor is connected to the compensation circuit, and a drain electrode of the second viewing angle control transistor is connected to an anode electrode of the second light emitting element.

16. An electronic device comprising:

a processor configured to output an input control signal and input image data;

a display device configured to display images based on the input image data, the display device comprising:

a display panel including a plurality of pixels;

a gate driver configured to generate a gate signal for providing the plurality of pixels with the gate signal;

a data driver configured to generate a data voltage for providing the plurality of pixels with the data voltage;

an emission driver configured to generate an emission signal for providing the plurality of pixels with the emission signal;

a driving controller configured to generate display image data based on the input control signal and the input image data; and a viewing angle controller configured to generate a first viewing angle signal and a second viewing angle signal for providing the plurality of pixels with the first viewing angle signal and the second viewing angle signal, wherein the display image data are alternately displayed on the display panel with different viewing angles in response to the first viewing angle signal and the second viewing angle signal, wherein each of the plurality of pixels includes:

a first light emitting circuit including a first light emitting element and a first viewing angle control transistor, in which the first viewing angle control transistor is turned on in response to the first viewing angle signal for transmitting a driving current to the first light emitting element; and a second light emitting circuit including a second light emitting element and a second viewing angle control transistor, in which the second viewing angle control transistor is turned on in response to the second viewing angle signal for transmitting the driving current to the second light emitting element, and wherein a viewing angle of the second light emitting circuit is narrower than a viewing angle of the first light emitting circuit, wherein, the display device is configured to operate in one of a normal mode and a narrow viewing angle mode, and in the normal mode, the first viewing angle signal has an activation level and the second viewing angle signal has a deactivation level in the odd and even frames, in which the odd frame is an odd-numbered frame among a series of frames and the even frame is an even-numbered frame among the series of frames, and, in the narrow viewing angle mode, the first viewing angle signal has the activation level and the second viewing angle signal has the deactivation level in the odd frame, and the first viewing angle signal has the deactivation level and the second viewing angle signal has the activation level in the even frame.

17. The electronic device of claim 16, further including an input/output (IO) device configured to sense user input via touch or cursor select of an icon presented on the display panel, wherein the processor is caused to execute one of the first viewing angle mode or the second viewing angle mode of the display device upon receipt of the user input, wherein the display panel includes a normal viewing angle area and a narrow viewing angle area, and when the processor is caused to execute first viewing angle mode, the viewing angle of the normal viewing angle area and the viewing angle of the narrow viewing angle area are substantially same, and when the processor is caused to execute second viewing angle mode, the viewing angle of the narrow viewing angle area is narrower than the viewing angle of the normal viewing angle area.

18. The display device of claim 1, wherein, in the normal mode, the first viewing angle signal has a logic low level in the even and odd frames and the second viewing angle signal has a logic high level in the even and odd frames, and, in the narrow viewing angle mode, the first viewing angle signal has a logic low level and the second viewing angle signal has a logic low level in the odd frame, and the first viewing angle signal has a logic high level and the second viewing angle signal has a logic low level in the even frame.

* * * * *